US012529993B2

(12) United States Patent
Zhu

(10) Patent No.: US 12,529,993 B2
(45) Date of Patent: Jan. 20, 2026

(54) DEVELOPING CARTRIDGE

(71) Applicants: E-Z INK TECHNOLOGY CO., LTD., Zhuhai (CN); ZHUHAI YANQI TECHNOLOGY CO., LTD., Zhuhai (CN)

(72) Inventor: Yu Zhu, Zhangjiajie (CN)

(73) Assignees: E-Z INK TECHNOLOGY CO., LTD., Zhuhai (CN); ZHUHAI YANQI TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 18/889,760

(22) Filed: Sep. 19, 2024

(65) Prior Publication Data

US 2025/0013189 A1 Jan. 9, 2025

Related U.S. Application Data

(63) Continuation-in-part of application No. PCT/CN2023/082426, filed on Mar. 20, 2023.

(30) Foreign Application Priority Data

Mar. 20, 2022 (CN) ......................... 202220604017.8
Jun. 22, 2022 (CN) ......................... 202210716526.4
Jul. 25, 2022 (CN) ......................... 202221938084.X

(51) Int. Cl.
*G03G 15/08* (2006.01)
*G03G 21/16* (2006.01)
*G03G 21/18* (2006.01)

(52) U.S. Cl.
CPC ..... *G03G 21/1676* (2013.01); *G03G 15/0806* (2013.01); *G03G 15/0889* (2013.01);
(Continued)

(58) Field of Classification Search
CPC ............... G03G 15/08; G03G 15/0806; G03G 15/0887; G03G 15/0889; G03G 21/16;
(Continued)

(56) References Cited

U.S. PATENT DOCUMENTS

RE49,689 E 10/2023 Itabashi
12,038,714 B2 7/2024 Ding et al.
(Continued)

FOREIGN PATENT DOCUMENTS

CN 201508462 U 6/2010
CN 105759586 A 7/2016
(Continued)

OTHER PUBLICATIONS

International Search Report issued in corresponding PCT Application No. PCT/CN2023/082426, dated Jul. 20, 2023.
(Continued)

*Primary Examiner* — Sophia S Chen
(74) *Attorney, Agent, or Firm* — Westbridge IP LLC

(57) ABSTRACT

Disclosed is a developing cartridge configured to be removably mounted in a main assembly of an imaging apparatus. In some embodiments disclosed, the developing cartridge includes: a cartridge body; a drive force receiving unit including a coupling member, disposed at a first end of the developing cartridge, configured to receive a drive force from the imaging apparatus; a driving member, disposed at the first end of the developing cartridge, configured to receive the drive force and move; a transmission member, receiving a force from the driving member to cause at least a portion of the transmission member to move along a longitudinal direction of the cartridge body; and a detected member provided at a second end of the developing cartridge, configured to be driven by the transmission member.

20 Claims, 25 Drawing Sheets

(52) U.S. Cl.
CPC ... *G03G 21/1857* (2013.01); *G03G 2221/163* (2013.01); *G03G 2221/1892* (2013.01)

(58) Field of Classification Search
CPC ........... G03G 21/1647; G03G 21/1676; G03G 21/18; G03G 21/1857; G03G 2221/163; G03G 2221/1892
See application file for complete search history.

(56) References Cited

U.S. PATENT DOCUMENTS

| | | | | |
|---|---|---|---|---|
| 2013/0051833 | A1 | 2/2013 | Itabashi et al. | |
| 2018/0181022 | A1* | 6/2018 | Itabashi | G03G 15/0806 |
| 2022/0171324 | A1 | 6/2022 | Ding et al. | |

FOREIGN PATENT DOCUMENTS

| | | | |
|---|---|---|---|
| CN | 108255033 | A | 7/2018 |
| CN | 210835596 | U | 6/2020 |
| CN | 111367154 | A | 7/2020 |
| CN | 211348997 | U | 8/2020 |
| CN | 211786598 | U | 10/2020 |
| CN | 212009285 | U | 11/2020 |
| CN | 112034693 | A | 12/2020 |
| CN | 212411015 | U | 1/2021 |
| CN | 212569430 | U | 2/2021 |
| CN | 114879462 | A | 8/2022 |
| CN | 114924472 | A | 8/2022 |
| CN | 217655422 | U | 10/2022 |
| CN | 116931396 | A | 10/2023 |
| CN | 220933347 | U | 5/2024 |
| CN | 111240168 | B | 11/2024 |
| CN | 111522215 | B | 11/2024 |
| JP | 2007058068 | A | 3/2007 |
| JP | 2009181031 | A | 8/2009 |
| JP | 2009244642 | A | 10/2009 |
| JP | 6711268 | B2 | 6/2020 |
| WO | 2021037030 | A1 | 3/2021 |
| WO | 2023246930 | A1 | 12/2023 |
| WO | 2024193615 | A1 | 9/2024 |

OTHER PUBLICATIONS

Written Opinion issued in corresponding PCT Application No. PCT/CN2023/082426, dated Jul. 20, 2023.

* cited by examiner

DEVELOPING CARTRIDGE

CROSS-REFERENCE TO RELATED APPLICATIONS

This application is a continuation-in-part of International Application No. PCT/CN2023/082426, filed on Mar. 20, 2023, which claims priority to Chinese Patent Application No. 202220604017.8, filed on Mar. 20, 2022, Chinese Patent Application No. 202210716526.4, filed on Jun. 22, 2022, and Chinese Patent Application No. 202221938084.X, filed on Jul. 25, 2022. All of the aforementioned patent applications are hereby incorporated by reference in their entireties.

TECHNICAL FIELD

The present disclosure relates to the field of electrophotographic imaging apparatus, and in particular to a developing cartridge.

BACKGROUND

As is known, as an electrophotographic type imaging apparatus, such an imaging apparatus includes a main assembly, a photoconductor drum provided in the main assembly, and a developing cartridge for supplying developer to the photoconductor drum.

Such an imaging apparatus includes a detection unit for judging information about a developing cartridge installed in the imaging apparatus. For example, the detection unit is configured to determine whether a newly installed developing cartridge in the imaging apparatus is a new product, or the size and capacity information of the developing cartridge, etc.

In this type of imaging apparatus, a developing cartridge can be mounted in a removable manner to a main assembly of the imaging apparatus, and the main assembly is provided with a transmission mechanism and a light sensor. The developing cartridge rotatably supports a detected mechanism, and the detected mechanism is provided with a protruding portion (detected member) that can contact and push the transmission mechanism. When the developing cartridge is mounted to the main assembly, the detected mechanism is driven to rotate and the protruding part pivots the transmission mechanism. The optical sensor detects the pivoting motion of the transmission mechanism, and the imaging apparatus determines the information of the developing cartridge based on the detection result of the optical sensor.

Similarly, in addition to judging the information of the developing cartridge by the detection result of the light sensor, there is also a way of detecting the information of the developing cartridge by means of capacitance, and the way of detecting the capacitance may be that the pivoting motion of the protruding portion contacting the transmission mechanism causes the capacitance to change, and the information of the developing cartridge is thus judged accordingly. Another way is to judge the information of the developing cartridge by the change of voltage or current of the circuit by switching on and off, and specifically, the switch can be disconnected or connected by the pivoting motion of the protruding part contacting the transmission mechanism.

There exists a developing cartridge in which a drive force receiving unit is provided at a first end along a longitudinal direction, a detected member is provided at a second end opposite to the first end, and a rotary shaft configured to receive a rotational drive force and rotate is provided between the first end and the second end so as to be configured to transmit a rotational drive force of the drive force receiving unit from the first end to the second end of the developing cartridge, thereby driving the detected member provided at the second end. In this case, a stirring member is rotatably provided in the developing cartridge for stirring the developer, and the rotational shaft of the stirring member is configured to transmit the rotational drive force for driving the detected member, which results in the rotational shaft of the stirring member being subjected to the force of stirring the developer and driving the detected member at the same time, and there is a risk of deformation or even fracture.

SUMMARY

The main object of the present disclosure is to provide a new driven structure of the detected member, wherein there is no need to transmit a force to drive the detected member through the rotational shaft of the stirring member, in order to eliminate the risk that the rotational shaft of the stirring member is susceptible to deformation or even fracture.

The object of the present disclosure can be achieved by the following technical solutions.

According to one aspect of the present disclosure, a developing cartridge removably mountable in a main assembly of an imaging apparatus along a front-rear direction of the developing cartridge comprises: a cartridge body; a drive force receiving unit, provided at a first end of the developing cartridge; a driving member, provided at the first end of the developing cartridge and configured to receive a drive force and move; a transmission member configured to receive a force from the driving member, wherein the force from the driving member causes at least a portion of the transmission member to move in a longitudinal direction of the cartridge body; a detected member, provided at a second end of the developing cartridge opposite to the first end along the longitudinal direction of the cartridge body, the detected member being configured to be driven by the transmission member; and a sliding groove portion provided on an upper surface of the cartridge body, wherein the transmission member is at least partially mounted in the sliding groove portion, and the sliding groove portion is configured to restrict movement of the transmission member along an up-down direction perpendicular to the longitudinal direction and a front-rear direction of the cartridge body.

In some embodiments, the sliding groove portion protrudes from the upper surface of the cartridge body, and the sliding groove portion is positioned higher than the transmission member along the up-down direction.

In some embodiments, a plurality of sliding groove portions are provided and are spaced apart along the longitudinal direction of the cartridge body.

In some embodiments, the detected member is configured as a sliding member and is configured to slide in response to a pushing force from the transmission member.

In some embodiments, the detected member is configured to move linearly in the front-rear direction of the cartridge body.

In some embodiments, the transmission member comprises a rod portion slidably disposed on the cartridge body and extending along the longitudinal direction, and at least a portion of the rod portion is disposed between the first end and the second end of the developing cartridge.

In some embodiments, the detected member comprises a force receiving portion and a detected portion, the force receiving portion being movably connected to the rod portion, and the detected portion extending in a direction different from an extension direction of the force receiving portion.

In some embodiments, the driving member comprises a cam member, the cam member comprises a main body portion and a cam portion configured to push the transmission member, and the cam portion protrudes from an end face of the main body portion along the longitudinal direction of the cartridge body.

In some embodiments, the developing cartridge further comprises a clutch mechanism configured to interrupt transmission of the drive force to the transmission member, wherein the clutch mechanism comprises a missing tooth portion provided on an outer circumferential surface of the main body portion.

In some embodiments, the developing cartridge further comprises a clutch mechanism configured to interrupt transmission of the drive force to the transmission member, wherein the clutch mechanism comprises a notched portion provided on a radially outer side of the main body portion.

In some embodiments, the transmission member comprises a force receiving portion configured to be pushed by the cam portion, and the force receiving portion is configured to fall into the notched portion such that the force receiving portion no longer receives a force from the cam portion.

In some embodiments, the transmission member is movable between a first position not pushed by the cam portion and a second position pushed by the cam portion.

In some embodiments, the developing cartridge further comprises a resilient member configured to apply a force to the transmission member to enable the transmission member to move from the second position towards the first position.

In some embodiments, the developing cartridge further comprises a resilient member provided at a first end of the rod portion and configured to support the rod portion.

In some embodiments, the developing cartridge further comprises a resilient member, wherein one end of the resilient member resists the cartridge body and another end of the resilient member resists the transmission member, and the transmission member comprises a housing portion for housing the resilient member.

According to another aspect of the present disclosure, a developing cartridge removably mountable in a main assembly of an imaging apparatus along a front-rear direction of the developing cartridge comprises: a cartridge body; a drive force receiving unit, provided at a first end of the developing cartridge; a driving member, provided at the first end of the developing cartridge and configured to receive a drive force and move; a transmission member configured to receive a force from the driving member, wherein the force from the driving member causes at least a portion of the transmission member to move in a longitudinal direction of the cartridge body; a detected member, provided at a second end of the developing cartridge opposite to the first end along the longitudinal direction of the cartridge body, the detected member being configured to be driven by the transmission member; and a sliding groove portion provided on an upper side of the cartridge body, wherein the transmission member is at least partially and slidably accommodated in the sliding groove portion, and an upper surface of the transmission member is flush with or lower than an upper surface of the cartridge body.

In some embodiments, the developing cartridge further comprises a covering portion at least partially covering the transmission member.

In some embodiments, opposite ends of the covering portion are provided with a first exposed portion and a second exposed portion, respectively, the first exposed portion and the second exposed portion are configured as openings; one end of the transmission member is configured to extend through the first exposed portion; and a detected portion of the detected member is configured to be exposed through the second exposed portion.

In some embodiments, a second end of the covering portion is provided with an accommodating cavity for accommodating the detected member.

In some embodiments, the transmission member is a flexible transmission member, and the driving member and the flexible transmission member form a transmission direction-change unit configured to transmit a rotational force of the drive force receiving unit to the detected member to cause the detected member to move, a movement direction of the detected member intersects with a rotational axis of the drive force receiving unit, and the movement of the detected member is a linear motion, a rotational motion, or a curvilinear motion.

According to still another aspect of the present disclosure, a developing cartridge removably mountable in a main assembly of an imaging apparatus comprises: a cartridge body; a drive force receiving unit comprising a coupling member, provided at a first end of the developing cartridge and configured to receive a drive force from the imaging apparatus; a driving member, provided at the first end of the developing cartridge and configured to receive the drive force and move; a transmission member configured to receive a force from the driving member, wherein the force causes at least a portion of the transmission member to move in a longitudinal direction of the cartridge body; and a detected member, provided at a second end of the developing cartridge and configured to be driven by the transmission member.

In some embodiments, the detected member is configured as a sliding member, and is configured to slide in response to a pushing force from the transmission member.

In some embodiments, the drive force receiving unit further comprises a stirring member gear, and the driving member is configured to engage with the stirring member gear.

In some embodiments, the driving member comprises a cam member, the cam member including a main body portion and a cam portion configured to push the transmission member, and wherein the cam portion protrudes from an end face of the main body portion along the longitudinal direction of the cartridge body.

In some embodiments, the cartridge body is provided with a sliding groove portion, and at least a portion of the transmission member is disposed in the sliding groove portion.

In some embodiments, the sliding groove portion protrudes from an outer surface of the cartridge body and is positioned higher than the transmission member, and wherein a side of the sliding groove portion facing the transmission member is configured to contact an outer surface of the transmission member, thereby restricting movement of the transmission member along an up-down direction of the developing cartridge.

In some embodiments, the sliding groove portion is provided on an upper side of the cartridge body, the transmission member is slidably accommodated in the sliding groove portion, and an upper surface of the transmission member is flush with or lower than an upper surface of the cartridge body.

In some embodiments, two sliding groove portions are provided on opposite sides of the transmission member; or multiple sliding groove portions are spaced apart along the longitudinal direction of the cartridge body.

In some embodiments, the detected member is configured to move in a front-rear direction of the developing cartridge.

In some embodiments, the developing cartridge further comprises a rotating body configured to receive the drive force transmitted by the coupling member and rotate, wherein the detected member is configured to rotate or pivot with the rotation of the rotating body.

In some embodiments, the driving member comprises a first transmission body, a rotational axis of the first transmission body being perpendicular to a rotational axis of the coupling member, wherein the first transmission body is provided with a first rotational force receiving portion for receiving rotational force, the first rotational force receiving portion comprising a gear portion.

In some embodiments, the transmission member comprises a flexible transmission member, the flexible transmission member connecting the first transmission body and the rotating body; wherein rotation of the first transmission body is configured to drive the flexible transmission member to rotate and move along the longitudinal direction of the cartridge body, thereby causing the rotating body to rotate through the flexible transmission member.

In some embodiments, the driving member comprises a first transmission body and a second transmission body, wherein the second transmission body is configured to receive a drive force from the drive force receiving unit, the first transmission body receiving the drive force from the second transmission body; wherein both the first transmission body and the second transmission body comprise bevel gear structures.

In some embodiments, the detected member is provided on the rotating body and is configured to rotate with the rotating body.

In some embodiments, the driving member comprises a first transmission body and a flexible transmission member; wherein one end of the flexible transmission member is wound on or connected to the first transmission body, and the other end is wound on the rotating body, with the winding directions of the flexible transmission member on the first transmission body and the rotating body being opposite to each other.

In some embodiments, the detected member is provided on and protrudes from an outer surface of the flexible transmission member.

In some embodiments, the transmission member comprises a flexible transmission member configured to operatively connect the driving member and the rotating body, thereby causing the rotating body to rotate; wherein the driving member comprises a first transmission body and a second transmission body, the first transmission body being provided with a first rotational force receiving portion for receiving rotational force and a first mounting portion for mounting the flexible transmission member, the second transmission body being provided with a second rotational force receiving portion and a rotational force transmitting portion, wherein the second rotational force receiving portion is configured to receive rotational drive force from the drive force receiving unit, and the rotational force transmitting portion is connected to the first rotational force receiving portion to transmit rotational drive force to the first transmission body.

In some embodiments, the first rotational force receiving portion comprises a first gear portion, the first mounting portion comprises an annular groove provided on a shaft portion of the first transmission body, the annular groove rotating with the rotation of the first gear portion; wherein the second rotational force receiving portion comprises a second gear portion, and the rotational force transmitting portion comprises a screw rod portion that meshes with the first gear portion for transmission.

In some embodiments, the developing cartridge further comprises a direction changing member, wherein the flexible transmission member is supported by the direction changing member to change direction by bending downward from an upper side.

In some embodiments, the developing cartridge further comprises a transmission interruption mechanism configured to interrupt the drive force transmitted from the first transmission body to the detected member, thereby causing the detected member to stop moving; wherein the transmission interruption mechanism comprises a smooth surface provided on an inner side of the flexible transmission member, such that when the smooth surface moves to a position in contact with the first transmission body, the flexible transmission member stops rotating.

In some embodiments, the driving member comprises a main body portion, a gear portion configured to engage with the drive force receiving unit, and an action portion configured to push the transmission member; wherein the transmission member is movable between a first position not pushed by the action portion and a second position pushed by the action portion.

In some embodiments, the action portion extends along an axial direction or a radial direction with respect to a rotational axis of the driving member.

In some embodiments, a rotational axis of the driving member is either perpendicular or parallel to a rotational axis of the coupling member.

In some embodiments, the transmission member is a sliding member comprising: a force receiving portion; and a rod portion slidably disposed on the cartridge body; wherein the action portion is configured to push the force receiving portion, causing the sliding member to slide along the longitudinal direction of the cartridge body.

In some embodiments, the transmission member is a pivoting member comprising: a force receiving portion; and a rod portion pivotally disposed on the cartridge body; wherein the action portion is configured to push the force receiving portion, causing the pivoting member to pivot in either a front-rear direction or an up-down direction of the cartridge body, resulting in at least a portion of the pivoting member moving along the longitudinal direction of the cartridge body.

In some embodiments, the developing cartridge further comprises a clutch mechanism configured to selectively interrupt transmission of the drive force to the transmission member.

In some embodiments, the clutch mechanism comprises a notched portion provided on an outer side of the main body portion, and wherein the action portion is configured to engage with the notched portion to interrupt the transmission of the drive force.

In some embodiments, the clutch mechanism comprises: a forcing structure configured to move at least a portion of the driving member, thereby interrupting the transmission of the drive force; and a retracting structure configured to provide a displacement space for the movement of the at least a portion of the driving member.

In some embodiments, the driving member and the drive force receiving unit form a geared engagement, and wherein the clutch mechanism comprises a missing tooth portion provided on the driving member.

In some embodiments, the detected member is pivotally connected, fixedly connected, or integrally molded with the transmission member.

In some embodiments, the drive force receiving unit further comprises one or more of a development roller gear, a stirring member gear, a powder feed roller gear, and an idler wheel. The driving member can engage with one of the development roller gear, stirring member gear, powder feed roller gear, and idler wheel, for example, engaging with the stirring member gear. The cartridge body is provided with a first side wall and a second side wall along its length, and at least a portion of the transmission member is disposed between the first side wall and the second side wall.

In some embodiments, the driving member is a cam member, the action portion is a cam portion, and the developing cartridge further comprises a resilient member, the resilient member being configured to apply a force to the transmission member to enable the transmission member to move in a direction from the second position to the first position.

In some embodiments, the cam member has a first bevel gear teeth portion and the drive force receiving unit has a second bevel gear teeth portion engaged with the first bevel gear teeth portion.

In some embodiments, the driving member is a grooved cam wheel member, the grooved cam wheel member comprising a guiding groove, the action portion being provided within the guiding groove or forming part of the guiding groove.

In some embodiments, the developing cartridge further comprises a rotating body, the rotating body having a rotational axis which intersects with the rotational axis of the coupling member; the driving member comprises a first transmission body having a rotational axis perpendicular to the rotational axis of the coupling member, the first transmission body being provided with a first rotational force receiving portion and a first mounting portion; the transmission member is a flexible transmission member, the flexible transmission member connecting the first mounting portion and the rotating body to rotate the rotating body, the detected member moving with the rotating body or the flexible transmission member to be detectable by a detection unit.

In some embodiments, the driving member further comprises a second transmission body, the second transmission body being provided with a second rotational force receiving portion and a rotational force transmitting portion whose rotational axis intersects with the rotational axis of the first rotational force receiving portion; wherein the second rotational force receiving portion engages with the drive force receiving unit to receive a rotational drive force, and the first rotational force receiving portion engages with the rotational force transmitting portion.

In some embodiments, the second rotational force receiving portion is a gear portion, one of the first rotational force receiving portion and the rotational force transmitting portion is a screw portion, and the other is a gear portion. Alternatively, both the first rotational force receiving portion and the rotational force transmitting portion are bevel gear teeth portions.

In some embodiments, the detected member is provided on an outer surface of the flexible transmission member or on an outer surface of the rotating body.

In some embodiments, the flexible transmission member is a flexible belt or chain, with one end of the flexible belt or chain being fitted to the shaft of the first transmission body and the other end being fitted to the shaft of the rotating body.

In some embodiments, the detected member is provided on an outer surface of the flexible belt or chain, or on an outer surface of the rotating body.

In some embodiments, the flexible transmission member is a flexible cord or wire, with one end of the flexible cord or wire being connected to a shaft portion of the first transmission member and the other end being wrapped around a shaft portion of the rotating body. The detected member is provided on an outer surface of the rotating body.

In some embodiments, an upper side of the cartridge body is further provided with an accommodating groove, at least a portion of the transmission member being provided in the accommodating groove.

In some embodiments, the developing cartridge further comprises a covering portion covering at least a portion of the transmission member.

In a developing cartridge having the above structure, the detected member is driven by a transmission member which is set to drive the detected member by moving at least a portion thereof along a longitudinal direction of the cartridge body, and there is no need to transmit a force to drive the detected member through a rotary axis of the stirring member, so that not only the risk of deformation or even fracture of the rotary axis of the stirring member is eliminated, but also the flexibility in design of the developing cartridge can be improved and the detection accuracy can be ensured.

DETAILED DESCRIPTION OF THE EMBODIMENTS

Embodiments disclose a developing cartridge of an imaging apparatus, the imaging apparatus comprises a main assembly and a detection unit 100 (see FIG. 1), a photoconductor drum, and a drive transmission member disposed in the main assembly, the detection unit 100 and the drive transmission member are disposed on different sides of the main assembly. The detection unit 100 is provided on one side of the main assembly for detecting information of a developing cartridge mounted in the main assembly, and is provided with a transmission mechanism 200 (see FIG. 1), which can receive a force of the developing cartridge and pivot, and the imaging apparatus determines the information of the developing cartridge by the situation in which the pivoting motion of the transmission mechanism 200 obscures the sensor 300 (see FIG. 1). The drive transmission member is provided on the other side of the main assembly for transmitting a drive force to the developing cartridge. The structure and detection principle of the imaging apparatus can be referred to the structure and detection principle of the printer disclosed in Chinese Patent Publication No. CN105759586A, and relevant prior art will not be repeated herein.

Hereinafter, the structure of the developing cartridge will be described in detail in connection with the embodiments.

Embodiment 1

Figure 1:
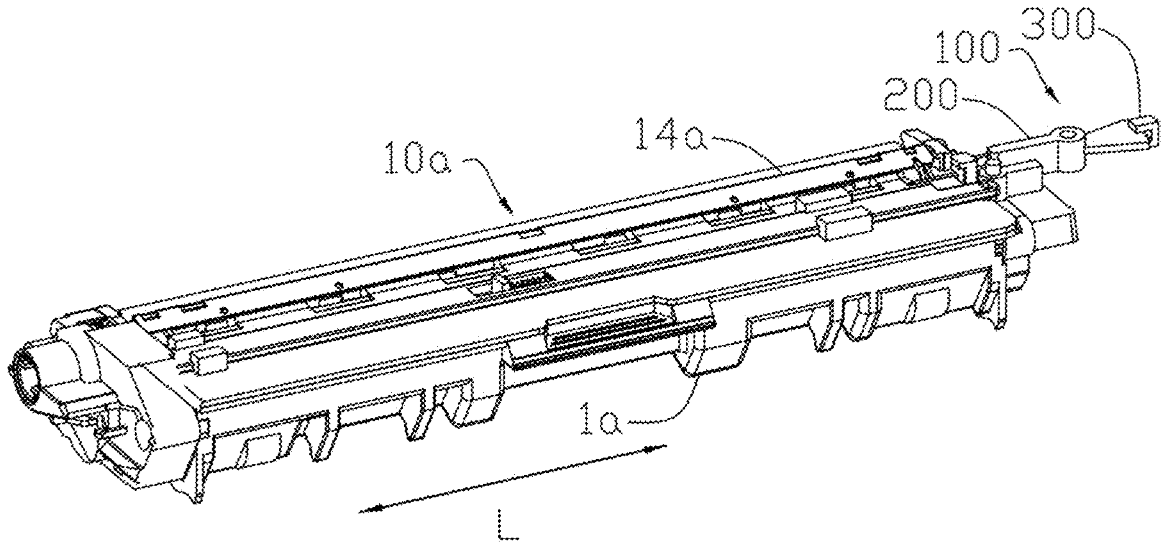
FIG. 1 is a schematic view of the overall structure of the developing cartridge in Embodiment 1 of the present disclosure.
Figure 2:
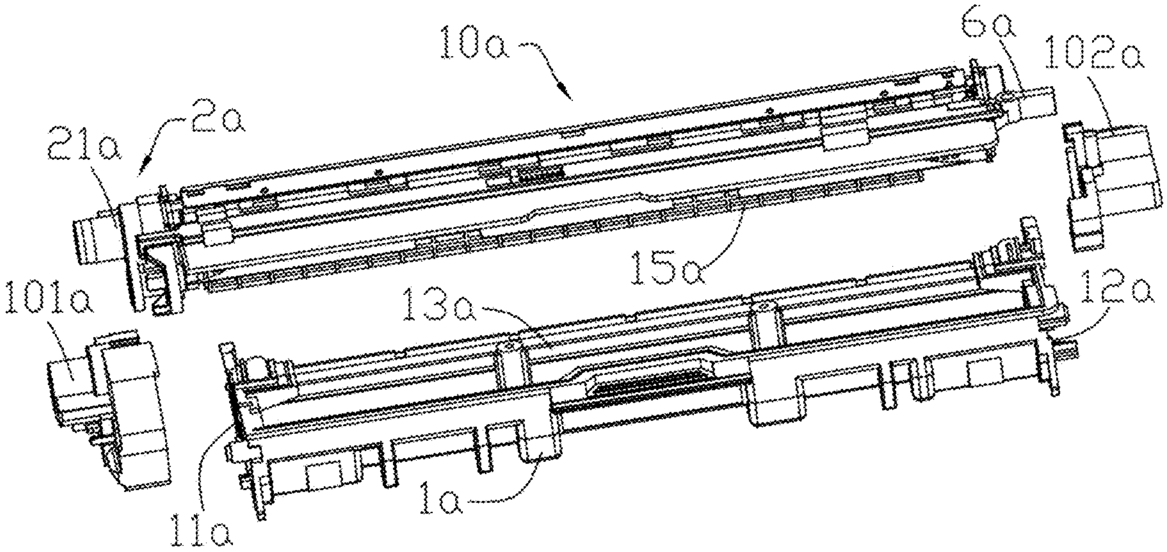
FIG. 2 is a schematic exploded view of partial structure of the developing cartridge in Embodiment 1 of the present disclosure.
Figure 3:
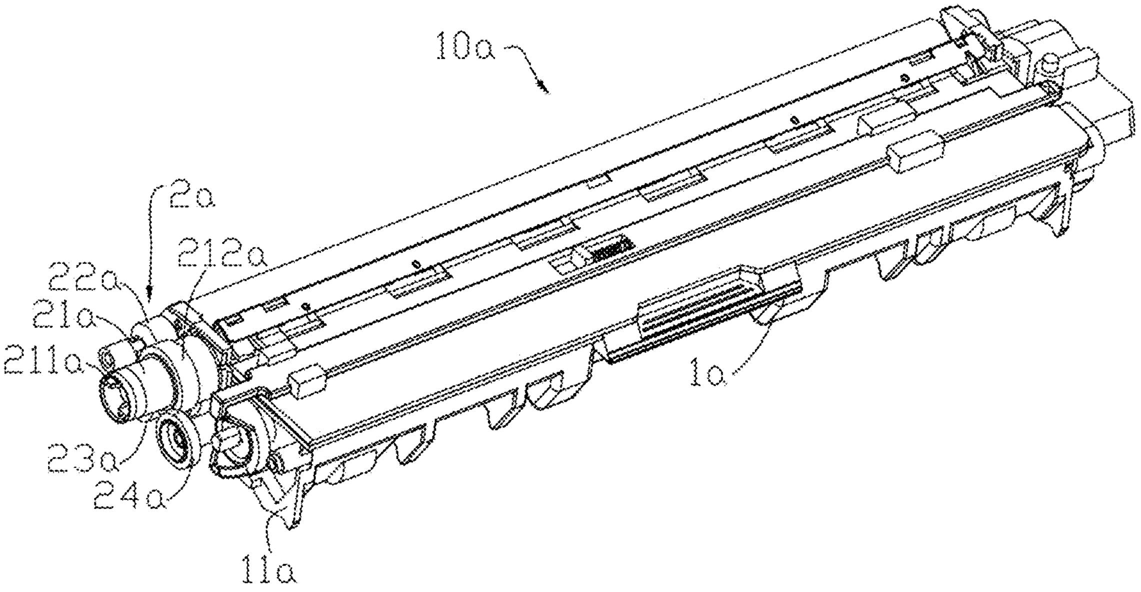
FIG. 3 is a schematic view of the structure of the developing cartridge in Embodiment 1 of the present disclosure with the first end cap omitted.

As shown in FIGS. 1 to 3, the developing cartridge 10*a* is removably mountable in the main assembly of the above-described imaging apparatus. The specific structure of which includes cartridge body 1*a* and drive force receiving unit 2*a*.

The cartridge body 1*a* is substantially cuboid in shape and is provided with a first side wall 11*a* and a second side wall 12*a* along the longitudinal direction L thereof. It generally includes a powder compartment 13*a* for accommodating developer, a development roller 14*a*, a powder feed roller, and a stirring member 15*a*. The development roller 14*a* is disposed on the front side of the developing cartridge 10*a* in the direction in which the developing cartridge 10*a* is mounted in the imaging apparatus, and is exposed from the front side of the cartridge body 1*a* and opposed to the photoconductor drum when the developing cartridge 10*a* is mounted in the imaging apparatus, to enable development work to be carried out. The powder feed roller faces the development roller 14*a* and is configured to deliver developer to the development roller 14*a*; and the stirring member 15*a* is configured to stir the developer accommodated in the powder compartment 13*a*.

The drive force receiving unit 2*a* is provided at a first side (or a first end of the developing cartridge 10*a*) along the longitudinal direction L of the cartridge body 1*a*. It is configured to receive a drive force from a drive transmission member of the imaging apparatus and transmit a rotational drive force to rotational members such as the development roller 14*a*. The drive force receiving unit 2*a* disclosed herein may include a coupling member 21*a*, or may include a coupling member 21*a* and one or more of a development roller gear 22*a*, a powder feed roller gear 23*a*, a stirring member gear, and an idler wheel 24*a*. In this embodiment, the drive force receiving unit 2*a* includes the coupling member 21*a*, the development roller gear 22*a*, the powder feed roller gear 23*a*, and the idler wheel 24*a*.

The coupling member 21*a* is rotatably supported on the first side wall 11*a* of the cartridge body 1*a*, and its rotational axis extends along the longitudinal direction L of the developing cartridge 10*a* parallel to the rotational axis of the development roller 14*a*. The coupling member 21*a* is provided with a drive force receiving portion 211*a* and a first gear portion 212*a*. The drive force receiving portion 211*a* is coupled with the drive transmission member of the imaging apparatus and receives the drive force. The first gear portion 212*a* is configured to engage with the development roller gear 22*a*, the powder feed roller gear 23*a*, and the idler wheel 24*a* to transmit a rotary drive force to the development roller gear 22*a*, the powder feed roller gear 23*a*, and the idler 24*a*. The development roller gear 22*a* and the powder feed roller gear 23*a* are provided at the ends of the development roller 14*a* and the powder feed roller, respectively, to rotate the development roller 14*a* and the powder feed roller. The stirring member gear is provided at an end portion of the stirring member 15*a* and meshes with the idler wheel 24*a* to drive the stirring member 15*a* to rotate.

The developing cartridge 10*a* is provided with a first end cap 101*a* and a second end cap 102*a* at each end of the developing cartridge 10*a*, the first end cap 101*a* being disposed on the outer side of the first side wall 11*a* to protect the drive force receiving unit 2*a*. The second end cap 102*a* is disposed on the outer side of the second side wall 12*a*, from which the detected member 6*a* (which will be described in more detail later) can be exposed.

Figure 4:
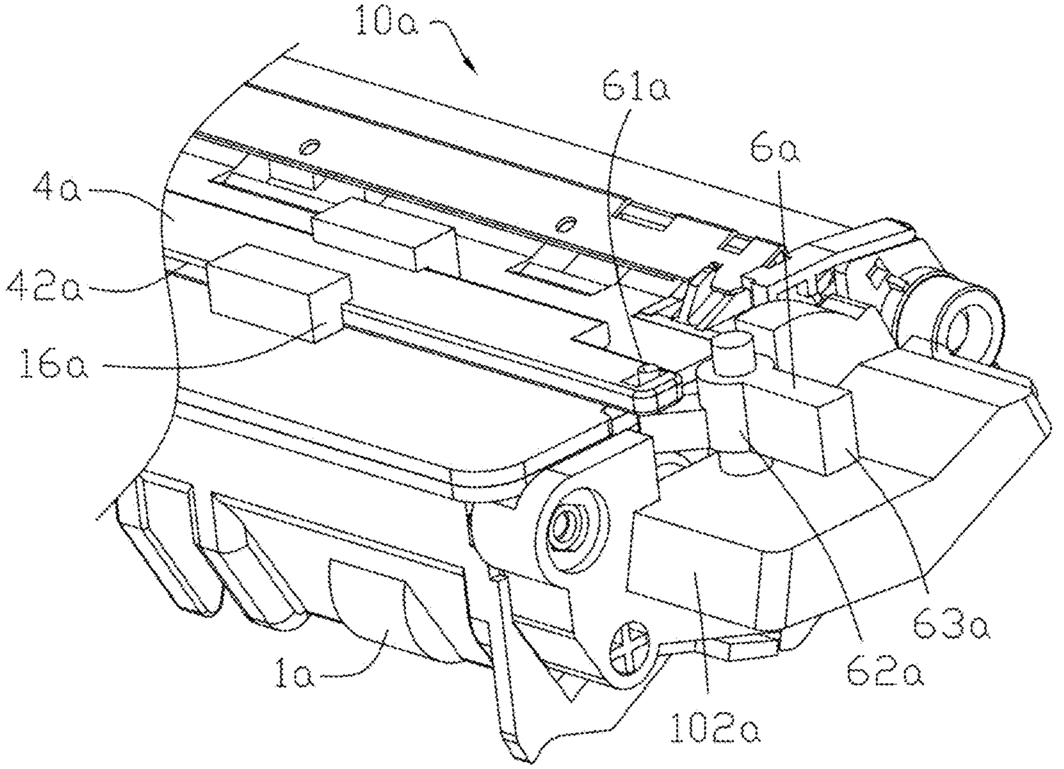
FIG. 4 is a schematic view of the structure of the second end of the developing cartridge in Embodiment 1 of the present disclosure.
Figure 5:
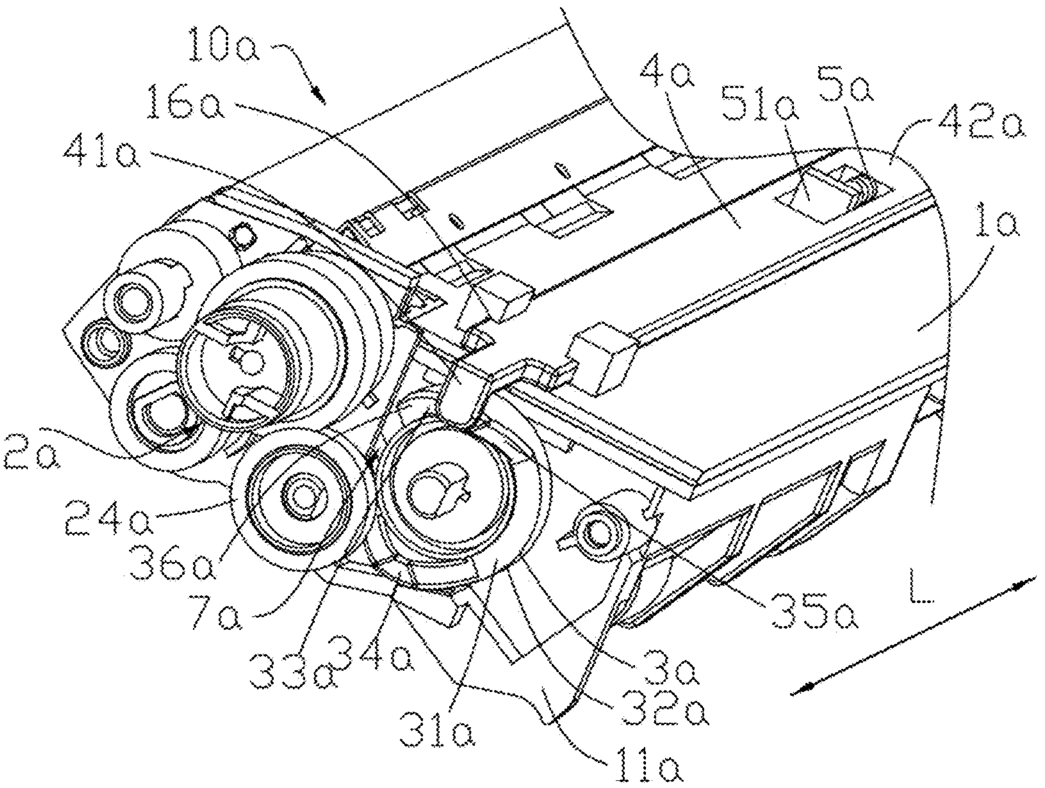
FIG. 5 is a schematic view of another partial structure of the developing cartridge in Embodiment 1 of the present disclosure.
Figure 6:
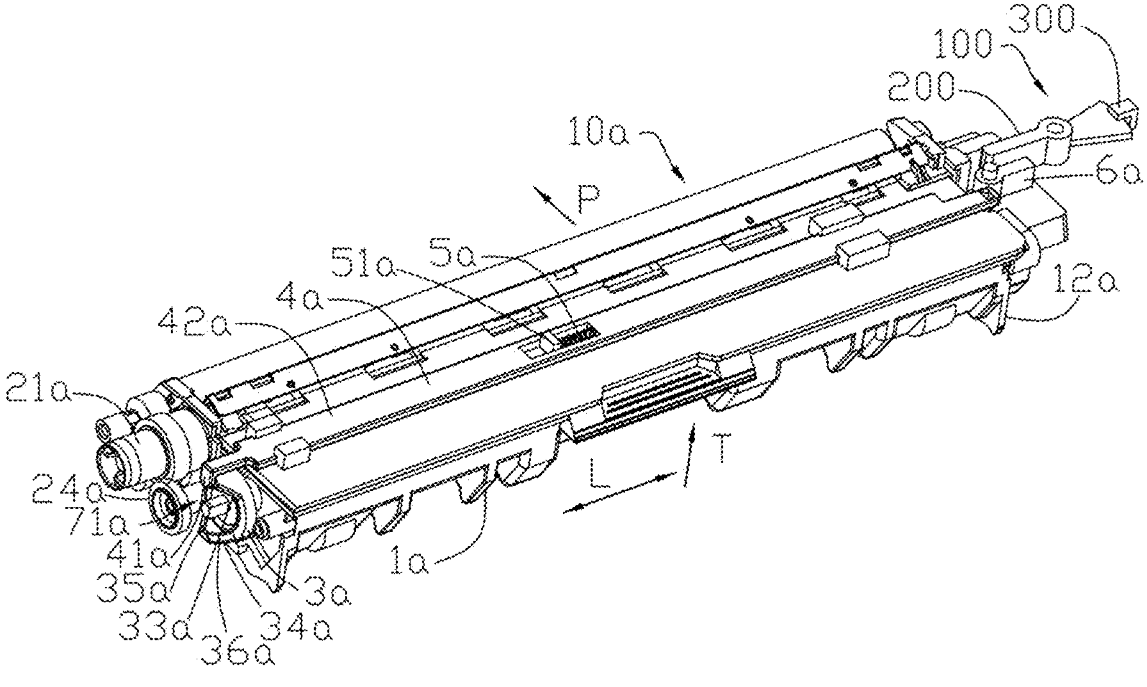
FIG. 6 is a schematic view of the structure of the developing cartridge when the transmission member in Embodiment 1 of the present disclosure is in the second position.

As shown in FIGS. 4 to 6, in this embodiment, the developing cartridge 10*a* is further provided with a driving member 3*a*, a transmission member 4*a*, a resilient member 5*a*, and a detected member 6*a*.

For ease of description, a direction parallel to a mounting direction P of the developing cartridge 10*a* is taken as a front-rear direction of the developing cartridge 10*a*, a position where the development roller 14*a* is located is taken as a front side of the developing cartridge 10*a*, and a side opposite to the front side is taken as a back side; a longitudinal direction L of the cartridge body 1*a* is taken as a right-left direction of the developing cartridge 10*a*, with a first side wall 11*a* located on the left side of the developing cartridge 10*a* and a second side wall 12*a* located on the right side; the direction perpendicular to the front-rear direction and the left-right direction is the up-down direction T. When the developing cartridge is mounted in the imaging apparatus, the upper side of the developing cartridge is above and the lower side is below.

The driving member 3*a* is configured to receive a drive force and move. The drive force reception may be direct from the drive force receiving unit 2*a* or indirect. The drive force may be in the form of a rotational drive force or a pushing force, and the corresponding movement of the driving member 3*a* may be rotation or sliding.

Preferably, the driving member is provided in a rotatable manner. The driving member may include a main body portion, a second gear portion configured to engage with the drive force receiving unit, and an action portion configured to push the transmission member. The action portion may extend in the direction of the rotational axis of the driving member or in the radial direction.

In this embodiment, the driving member is a cam member 3*a*, and the action portion is a cam portion. Specifically, the cam member 3*a* includes a cylindrical main body portion 31*a*, and the main body portion 31*a* is provided with a second gear portion 32*a* configured to engage with the drive force receiving unit 2*a* and a cam portion configured to push the transmission member 4*a*. In the present disclosure, the cam portion may be or include a protruding portion extending in the direction of the rotational axis of the cam member or in the radial direction.

In this embodiment, the rotational axis of the cam member 3*a* is parallel to the longitudinal direction L of the cartridge body 1*a*, and the cam portion includes two cam portions; a first cam portion 33*a* and a second cam portion 34*a*, and the first cam portion 33*a* and the second cam portion 34*a* have essentially the same shape and structure, and the first cam portion 33*a* will be described as an example below.

The first cam portion 33*a* protrudes from the end face of the main body portion 31*a* along the longitudinal direction L of the cartridge body 1*a*. Specifically, this first cam portion 33*a* protrudes along the longitudinal direction L of the cartridge body 1*a* in a direction away from the first side wall 11*a*, and it is also provided with a first guiding surface 35*a* and a second guiding surface 36*a* on its side, and in the rotational direction of the cam member 3*a*, the first guiding surface 35*a* is located upstream of the second guiding surface 36*a*. The main body portion 31*a* is cylindrical in shape, and the two cam portions are provided on the circumference of the main body portion 31*a* at predetermined spaced intervals.

In this embodiment, the cam member 3*a* is provided at an end portion of the stirring member 15*a*, which can serve as a gear for the stirring member 15*a*, and the second gear portion 32*a* engages with the idler wheel 24*a* of the drive force receiving unit 2*a* to receive a rotational drive force which is configured to drive the stirring member 15*a* to rotate.

Optionally, the cam member 3*a* may also be provided at the end of the development roller 14*a* or the powder feed roller, or may be independently provided on the cartridge body 1*a*.

The transmission member 4*a* is configured to receive a force from the driving member 3*a* to cause at least a portion of the transmission member 4*a* to move along the longitudinal direction L of the cartridge body 1*a*. The transmission member 4*a* is configured to drive the detected member 6*a*. This driving can be achieved in various ways: the detected member 6*a* may be fixedly connected to the transmission member 4*a* or integrally molded it and move along with the movement of the transmission member 4*a*; the detected member 6*a* may be movably connected to the transmission member 4*a*; or the driving can be achieved by the transmission member 4*a* contacting the detected member 6*a*.

The transmission member 4*a* is movable between a first position not pushed by the cam portion and a second position pushed by the cam portion. The transmission member 4*a* is provided with a force receiving portion 41*a* that receives a force from the cam portion of the cam member 3*a*, and the force receiving portion 41*a* is also configured to be pushed by the cam portion so as to enable the transmission member 4*a* to move between the first position and the second position.

In this embodiment, the transmission member 4*a* is a sliding member comprising a force receiving portion 41*a* and a rod portion 42*a*. The rod portion 42*a* extends along the longitudinal direction L of the cartridge body 1*a*, with at least a portion of it disposed between the first side wall 11*a* and the second side wall 12*a*. The rod portion 42*a* is slidably disposed on the cartridge body 1*a*, and the cam portion is configured to push the force receiving portion 41*a* to slide along the longitudinal direction L of the cartridge body 1*a*.

The cartridge body 1*a* is provided with a sliding groove portion 16*a* as an example of an accommodating groove for the transmission member, and the transmission member 4*a* is at least partially mounted in the sliding groove portion 16*a* to enable it to slide along the longitudinal direction L of the cartridge body 1*a*. The number of sliding groove portions 16*a* may be one or more. The manner of realizing the sliding of the transmission member 4*a* is not limited to the slide groove method, but may also include the provision of a storage portion for storing the transmission member 4*a*, or other methods.

As shown in FIGS. 4 and 5, the sliding groove portion 16*a* protrudes from an outer surface of the cartridge body 1*a* and is positioned higher than the transmission member 4*a*. A side of the sliding groove portion 16*a* facing the transmission member 4*a* is configured to contact an outer surface of the transmission member 4*a*, thereby restricting movement of the transmission member 4*a* along an up-down direction T of the developing cartridge.

As an example, there may be two sliding groove portions 16*a*, and the two sliding groove portions 16*a* are provided on opposite sides of the transmission member 4*a*. Alternatively, there may be multiple sliding groove portions 16*a*, and the multiple sliding groove portions 16*a* are spaced apart along the longitudinal direction L of the cartridge body 1*a*.

The resilient member 5*a* is configured to apply a force to the transmission member 4*a* to enable it to move from the second position towards the first position.

Specifically, the resilient member 5*a* is a compression spring, one end of which resists the resilient member support 51*a* on the cartridge body 1*a*, and the other end of which resists a portion of the transmission member 4*a*. When the transmission member 4*a* moves from the first position to the second position, it compresses the resilient member 5*a* to the left. More specifically, the transmission member 4*a* has a housing portion in which the resilient member 5*a* is housed.

Optionally, such a resilient member 5*a* may also be an extension spring, a torsion spring, or an elastic sponge body, etc.

The detected member 6*a* is provided at the second end of the developing cartridge 10*a* and is configured to be driven by the transmission member 4*a*. This driving may be either direct or indirect. For example, the detected member 6*a* may be integrally molded with the transmission member 4*a*, connected in a linkage relationship, or driven at a predetermined distance apart etc. All of these fall within the scope of driving in the disclosure.

In this embodiment, the detected member 6*a* is pivotally disposed at the second end of the cartridge body 1*a* and is configured to be driven by the transmission member 4*a*. Specifically, the detected member 6*a* is provided with a force receiving portion 61*a*, a connection portion 62*a*, and a detected portion 63*a*, and the connection portion 62*a* is pivotally connected to a pivot axis on the cartridge body 1*a* or the second end cap 102*a* forming a pivoting center.

The force receiving portion 61*a* extends from the connection portion 62*a* and is connected to one end of the transmission member 4*a* in a pivotal manner (e.g., to form a link mechanism). Specifically, the end portion of the rod portion 42*a* is provided with a circular hole and is movably connected to the shaft portion (force receiving portion 61*a*) of the detected member 6*a*, so that when the transmission member 4*a* moves along the longitudinal direction L of the cartridge body 1*a*, it can drive the detected member 6*a* to pivot. The detected portion 63*a* extends along a direction different from the extension direction of the force receiving portion 61*a*, so as to be able to trigger the detection unit 100 of the imaging apparatus when the detected member 6*a* pivots.

It can be understood that in this embodiment, during the pivoting movement of the detected member 6*a*, the detected member 6*a* can also be considered to move along a front-rear direction of the cartridge body 1*a*. In addition, this embodiment does not limit the specific manner in which the detected member 6*a* moves along the front-rear direction of the cartridge body 1*a*. For example, it could also move in a linear translation or along an arc-shaped path, which is not limited herein.

In this embodiment, the developing cartridge 10*a* further comprises a clutch mechanism 7*a* for interrupting the transmission of the drive force to the transmission member 4*a*. Specifically, the clutch mechanism 7*a* includes a notched portion 71*a* provided on the cam member 3*a*. The notched portion 71*a* is provided on the radially outer side of the main body portion 31*a* of the cam member 3*a*, and the force receiving portion 41*a* of the transmission member 4*a* can fall into the notched portion 71*a*. When this happens, the force receiving portion 41*a* is detached from the path through which the rotational process of the cam portion passes, no longer receives a force from the cam portion, thus interrupting the drive force transmission.

The process by which the developing cartridge 10*a* is detected by the detection unit 100 of the imaging apparatus will now be described with reference to FIGS. 4 to 7.

As shown in FIG. 6, in this embodiment, when the developing cartridge 10*a* is in an unused state, the transmission member 4*a* is in the second position (initial position), the resilient member 5*a* is in a compressed state, and the detected member 6*a* is in a state where it has not triggered the detection unit 100.

The user installs the developing cartridge 10*a* into the imaging apparatus, and the coupling member 21*a* is coupled to a drive transmission member of the imaging apparatus. When the imaging apparatus begins to operate, the idler wheel 24*a* receives the drive force from the coupling member 21*a* and rotates the cam member 3*a*. As the cam member 3*a* rotates, the force receiving portion 41*a* moves from the top of the first cam portion 33*a* along the first guiding surface 35*a* towards the root of the first cam portion 33*a* under the pushing of the first cam portion 33*a*. At this time, under the action of the elastic restoring force of the resilient member 5*a*, the transmission member 4*a* slides to the right side, and the detected member 6*a* rotates and contacts the detection unit 100 of the imaging apparatus, driven by the transmission member 4*a*.

Figure 7:
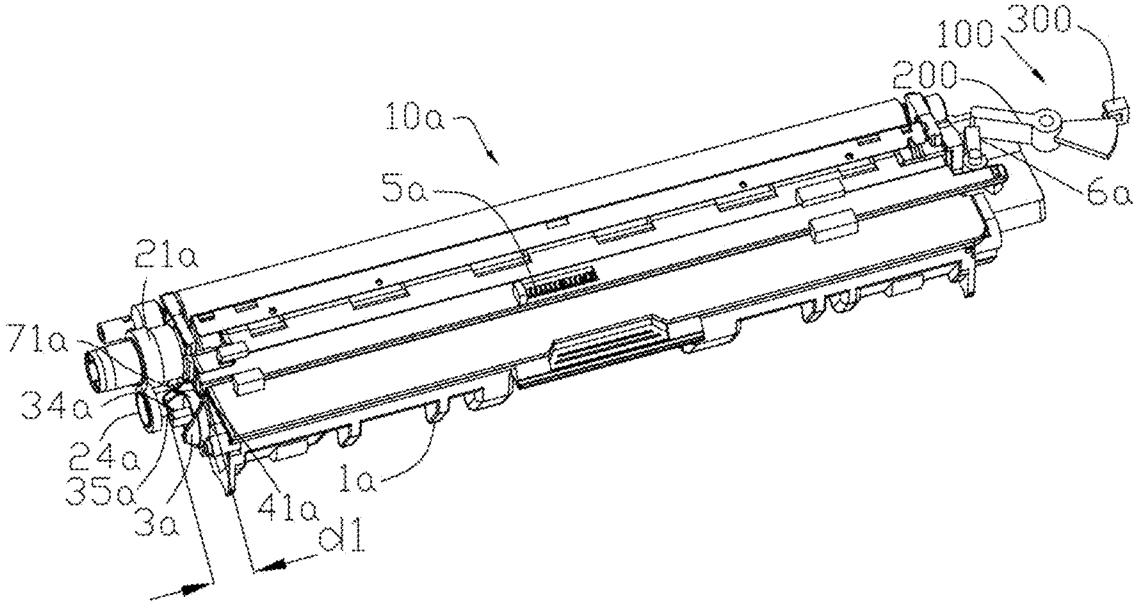
FIG. 7 is a schematic view of the structure of the developing cartridge in Embodiment 1 of the present disclosure at the completion of detection.

As the cam member 3*a* continues to rotate, the force receiving portion 41*a* of the transmission member 4*a* moves from the root of the cam portion to the top of the second cam portion 34*a* along the second guiding surface 36*a* of the second cam portion 34*a* under the pushing of the second cam portion 34*a*, at which time the transmission member 4*a* slides to the left and rotates the detected member 6*a*, which disengages from the detection unit 100. As the force receiving portion 41*a* moves along the first guide surface 35*a* from the top of the second cam portion 34*a* to the root of the second cam portion 34*a*, under the action of the elastic restoring force of the resilient member 5*a*, the transmission member 4*a* slides to the right and rotates the detected member 6*a*, causing the detected member 6*a* to contact the detection unit 100 for a second time. As the cam member 3*a* continues to rotate, the force receiving portion 41*a* moves along the end face of the cam member 3*a* and ultimately falls into the notched portion 71*a* as shown in FIG. 7. The cam member 3*a* continues to rotate but the transmission member 4*a* is no longer pushed, and the detection is completed.

The number of cam portions can be set according to the number of times the detection unit 100 needs to be toggled, for example, one cam portion can be set when it needs to be toggled once, and multiple cam portions can be set when it needs to be toggled multiple time. The structures of different cam portions can also be different, and they can be set according to the strength and amplitude of the pushing force on the transmission member, so as to differentiate between different types or capacities of developing cartridges.

In the developing cartridge 10*a* with the above-described structure, the transmission member 4*a* moves at least partially along the longitudinal direction L of the cartridge body 1*a*. As can be seen with reference to FIG. 7, the transmission member 4*a* moves along the longitudinal direction L of the cartridge body 1*a* by a distance d1, which is the same as or greater than the protruding amount (i.e., the distance from the root of the cam portion to the top of the cam portion) of the cam portion.

The developing cartridge 10*a* with the above-described structure eliminates the need to transmit the drive force for driving the detected member 6*a* through the rotary shaft of the stirring member 15*a*, thereby eliminating the risk of deformation or even fracture of the rotary shaft of the stirring member 15*a*. The adoption of a sliding method to achieve the transmission of the drive force from the first end of the developing cartridge 10*a* to the second end of the developing cartridge 10*a* solves the problem of delayed transmission of the drive force caused by the deformation of the rotary shaft of the stirring member 15*a*, and improves the detection accuracy. Additionally, the torque required for the developing cartridge 10*a* is greatly reduced, resulting in more stable operation of the developing cartridge 10*a*.

In some embodiments, the detected member is integrally molded with the transmission member 4*a*, and the detected member is provided at the end of the transmission member 4*a* and moves with the movement of the transmission member 4*a* so as to be configured to trigger the detection unit 100 of the imaging apparatus.

In some embodiments, the detected member 6*a* is set up as a sliding member, relying on the pushing force of the transmission member 4*a* for sliding.

In some embodiments, the resilient member 5*a* is not connected to the transmission member 4*a*, but is set to be connected to the detected member 6*a*, which pushes the transmission member 4*a* to move from the second position towards the first position.

In some embodiments, the detected member does not come into contact with the transmission member, i.e., the two can be spaced apart by a predetermined distance, as long as the detected member 6*a* can be driven when the transmission member 4*a* moves.

In some embodiments, the clutch mechanism may also be provided between the drive force receiving unit 2*a* and the cam member 3*a* to indirectly interrupt transmission of the drive force to the transmission member 4*a* by interrupting the transmission of the drive force between the drive force receiving unit 2*a* and the cam member 3*a*.

In some embodiments, the driving member 3*a* is a rack structure engaged with the drive force receiving unit 2*a*, which receives the drive force to move and is configured to push the transmission member 4*a* along the longitudinal direction of the developing cartridge.

In some embodiments, the initial position of the transmission member 4*a* is the first position, and the transmission member 4*a* drives the detected member 6*a* to contact the detection unit in the imaging apparatus when it moves from the first position to the second position.

In some embodiments, the detected member 6*a* may or may not be in contact with the transmission mechanism 200 of the detection unit 100 in an initial position.

In some embodiments, the above variations are combined according to design needs.

Embodiment 2

This embodiment is an improvement based on Embodiment 1 and its variations, the shape and structure of the developing cartridge in Embodiment 2 are essentially the same as the developing cartridge in Embodiment 1, the same parts will not be repeated, and the following mainly introduces the differences.

Figure 8:
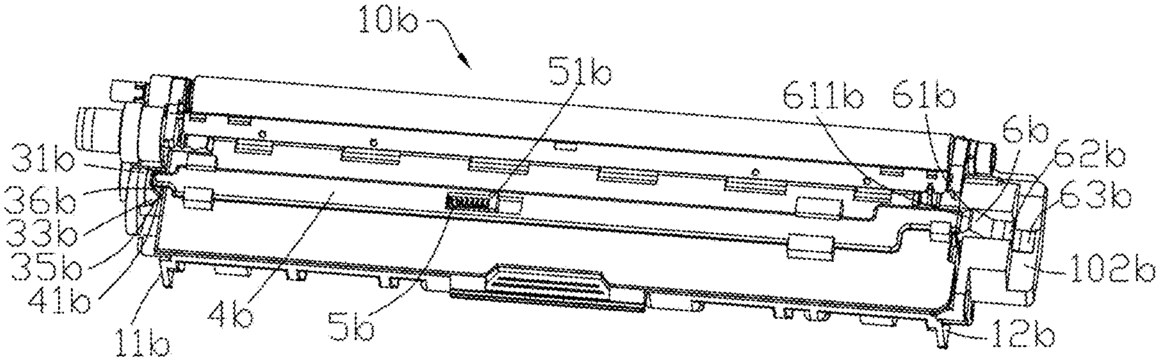
FIG. 8 is a schematic view of the overall structure of the developing cartridge when the transmission member in Embodiment 2 of the present disclosure is in a first position.
Figure 9:
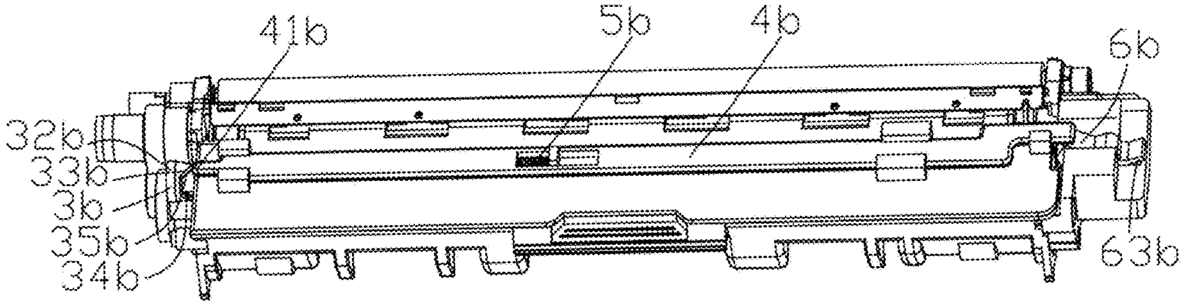
FIG. 9 is a schematic view of the overall structure of the developing cartridge when the transmission member in Embodiment 2 of the present disclosure is in the second position.

As shown in FIGS. 8 and 9, in the present embodiment, the cam portion protrudes in a direction opposite to the direction of protrusion of the cam portion in Embodiment 1. In this embodiment, there are two cam portions: a first cam portion 33*b* and a second cam portion 34*b*. The first cam portion 33*b* will be described as an example below. The first cam portion 33*b* protrudes from the end face of the main body portion 31_b_ in a direction towards the first side wall 11_b_ and is configured to push the force receiving portion 41_b_ of the transmission member 4_b_.

The direction of force applied by the resilient member 5_b_ to the transmission member 4_b_ is towards the leftward direction, and the resilient member support portion 51_b_ is located on the right side of the resilient member 5_b_. The initial position of the transmission member 4_b_ is in the first position where the force receiving portion 41_b_ of the transmission member 4_b_ abuts against the right side end face of the main body portion 31_b_.

In this embodiment, the detected member 6_b_ is configured to pivot in the up-down direction along the cartridge body, specifically the detected member 6_b_ is provided with a force receiving portion 61_b_, a connection portion 62_b_, and a detected portion 63_b_, the connection portion 62_b_ is pivotally connected to the second end cap 102_b_, the force receiving portion 61_b_ extends from the connection portion 62_b_ towards the transmission member 4_b_. The force receiving portion 61_b_ is also provided with a pressing surface 611_b_, which, when pressed by the transmission member 4_b_, causes the detected member 6_b_ to rotate around the pivoting center. The detected portion 63_b_ is provided on the other side of the connection portion 62_b_, and when the pressing surface 611_b_ is pushed by the transmission member 4_b_, the detected portion 63_b_ tilts upwardly to be able to trigger the detection unit 100 of the imaging apparatus.

Optionally, the moving direction of the detected portion 63_b_ may be set according to its position relative to the detection unit 100 of the imaging apparatus.

The process by which the developing cartridge 10_b_ is detected by the detection unit 100 of the imaging apparatus will now be described with reference to FIGS. 8 and 9.

As shown in FIG. 8, in this embodiment, when the developing cartridge 10_b_ is in an unused state, the transmission member 4_b_ is in the first position (initial position), the resilient member 5_b_ is not compressed, and the detected member 6_b_ has not triggered the detection unit 100.

When the imaging apparatus begins to operate, the cam member 3_b_ receives a drive force through the second gear portion 32_b_ and rotates, causing the force receiving portion 41_b_ to move from the root portion of the first cam portion 33_b_ along the second guiding surface 36_b_ towards the top portion of the first cam portion 33_b_ under the pushing of the first cam portion 33_b_. At this time, the transmission member 4_b_ is forced to slide to the right. As shown in FIG. 9, the transmission member 4_b_ is in the second position, the resilient member 5_b_ is compressed, the transmission member 4_b_ presses against the pressing surface 611_b_ of the detected member 6_b_ causing the detected member 6_b_ to rotate, and the detected portion 63_b_ tilts upwardly to contact the detection unit 100 of the imaging apparatus.

As the force receiving portion 41_b_ moves from the top of the first cam portion 33_b_ along the first guiding surface 35_b_ towards the root of the first cam portion 33_b_, the transmission member 4_b_ is forced to move to the left under the action of the resilient restoring force of the resilient member 5_b_, the transmission member 4_b_ no longer presses the detected member 6_b_, and the detected portion 63_b_ of the detected member 6_b_ can move downwardly under its own gravity and return to its initial state. When the second cam portion 34_b_ pushes the force receiving portion 41_b_ of the transmission member 4_b_, the detected member 6_b_ contacts the detection unit 100 for a second time, and detection is completed.

In some embodiments, the developing cartridge is further provided with a resilient reset member that applies a resilient force to the detected member 6_b_, enabling the detected member 6_b_ to return to the initial state. Specifically, the resilient reset member may be a compression spring that supports the force receiving portion 61_b_ of the detected member 6_b_ in the upward direction so that the detected member 6_b_ remains at in the initial position.

In some other embodiments, the above variations are combined as needed for the design.

Embodiment 3

This embodiment is an improvement based on Embodiment 1 and its variations, the shape and structure of the developing cartridge in Embodiment 3 are essentially the same as the developing cartridge in Embodiment 1, and the same parts will not be repeated, and the following mainly describes the differences.

Figure 10:
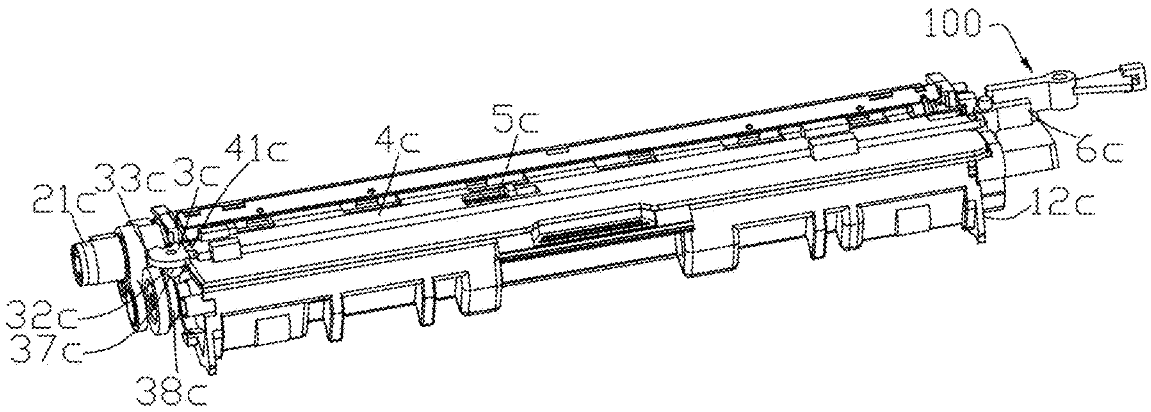
FIG. 10 is a schematic view of the overall structure of the developing cartridge when the transmission member in Embodiment 3 of the present disclosure is in the first position.
Figure 11:
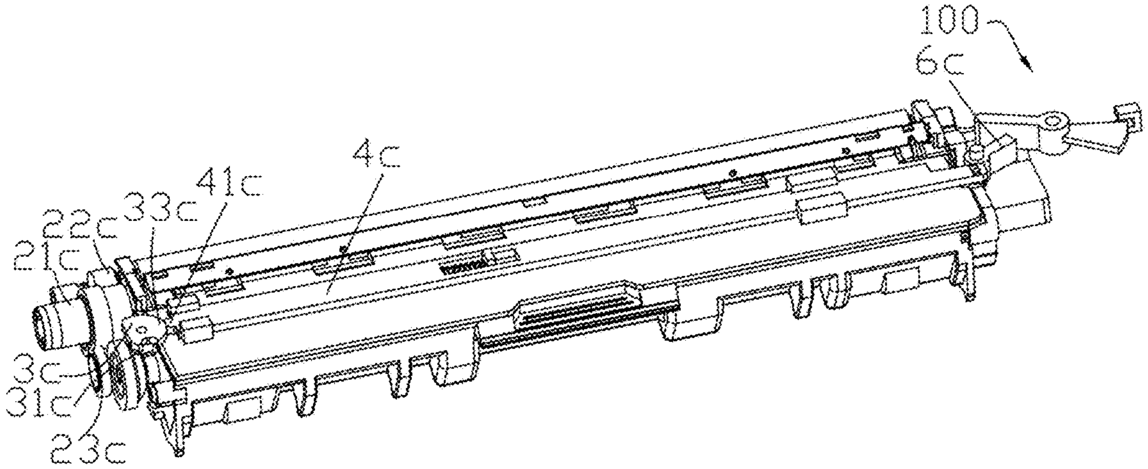
FIG. 11 is a schematic view of the overall structure of the developing cartridge when the transmission member in Embodiment 3 of the present disclosure is in the second position.

As shown in FIGS. 10 and 11, in this embodiment, the rotational axis of the cam member 3_c_ and that of the coupling member 21_c_ are intersecting (including cases where they intersect in the same plane and where their projections intersect on the same plane).

Specifically, the rotational axis of the cam member 3_c_ is set perpendicular to the rotational axis of the coupling member 21_c_, and the second gear portion 32_c_ of the cam member 3_c_ is a first bevel gear teeth portion which engages with a second bevel gear teeth portion 38_c_ provided on the stirring member gear. The cam portion 33_c_ of the cam member 3_c_ is provided on the upper side of the cam member 3_c_, and the cam portion 33_c_ extends outwardly in the radial direction from the main body portion 31_c_.

In this embodiment, the clutch mechanism includes a missing tooth portion 37_c_ provided on the outer circumferential surface of the main body portion 31_c_ of the cam member 3_c_, and when the missing tooth portion 37_c_ rotates to face the second bevel gear teeth portion 38_c_, the transmission of the drive force between the second bevel gear teeth portion 38_c_ and the first bevel gear teeth portion 32_c_ is interrupted.

The force receiving portion 41_c_ of the transmission member 4_c_ is located closer to the second side wall 12_c_ compared to the cam portion 33_c_. In this embodiment, when the developing cartridge is not in use, the transmission member is in the first position (the position shown in FIG. 10), and the force receiving portion 41_c_ abuts against the root portion of the cam portion. When the second gear portion 32_c_ of the cam member 3_c_ receives the drive force and rotates, the cam portion 33_c_ pushes the force receiving portion 41_c_, causing the transmission member 4_c_ to slide to the right, driving the detected member 6_c_ to rotate, thereby triggering the detection unit 100 of the imaging apparatus. As shown in FIG. 11, the transmission member 4_c_ is in the second position. As the cam member 3_c_ continues rotating, the force receiving portion 41_c_ moves from the top of the cam portion 33_c_ towards its root, the transmission member 4_c_ slides to the left under the action of the elastic restoring force of the resilient member 5_c_ and drives the detected member 6_c_ to pivot, and the detected member 6_c_ disengages from the detection unit 100, and detection is completed.

In some embodiments, the second bevel gear teeth portion may be provided on the coupling member 21_c_, the development roller gear 22_c_, the powder feed roller gear 23_c_, or the idler wheel 24_c_.

In some embodiments, the force receiving portion 41_c_ of the transmission member 4_c_ is located further away from the second side wall 12_c_ compared to the cam portion.

In some other embodiments, the above variations are combined as required by the design.

Embodiment 4

This embodiment is an improvement based on Embodiment 1 and its variations, the shape and structure of the developing cartridge in Embodiment 4 are essentially the same as the developing cartridge in Embodiment 1, and the same parts will not be repeated, and the following mainly describes the differences.

Figure 12A:
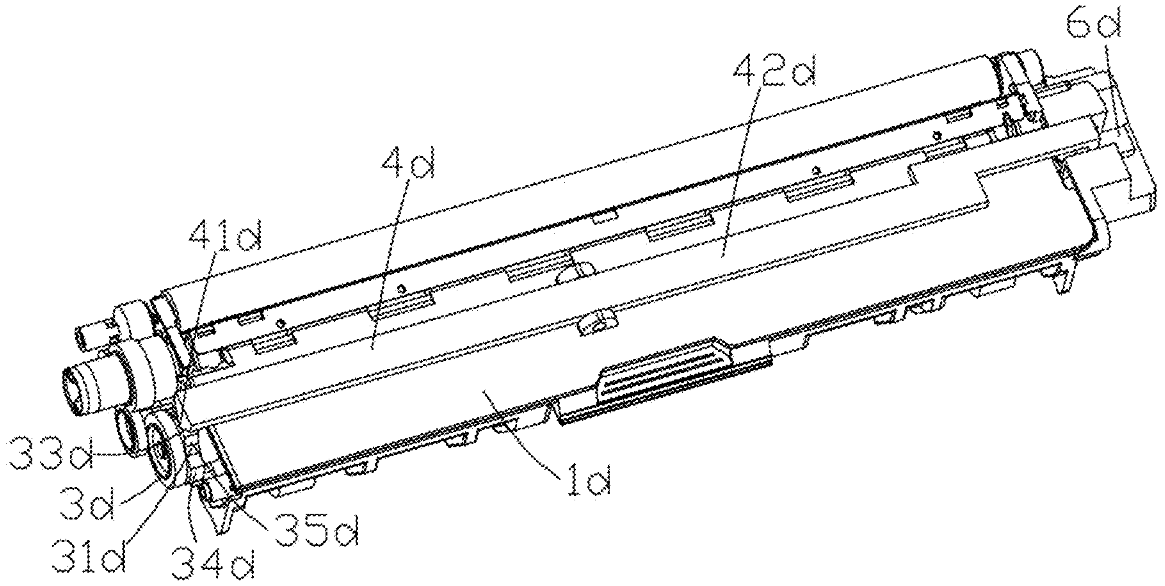
FIG. 12*a* is a schematic view of the overall structure of the developing cartridge when the transmission member in Embodiment 4 of the present disclosure is in the second position.
Figure 12B:
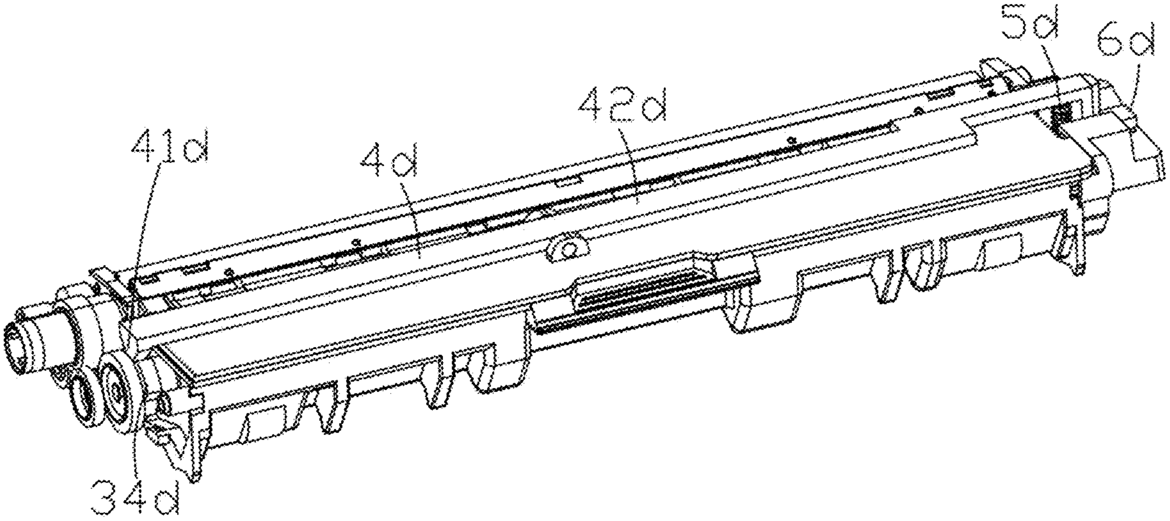
FIG. 12*b* is a schematic view of the overall structure of the developing cartridge when the transmission member in Embodiment 4 of the present disclosure is in the first position.

As shown in FIGS. 12*a* and 12*b*, in this embodiment, the transmission member 4*d* is a pivoting member, at least a portion of which is movable along the longitudinal direction L of the cartridge body 1*d*.

The transmission member 4*d* comprises a force receiving portion 41*d* and a rod portion 42*d*. The middle portion of the rod portion 42*d* is connected to the cartridge body 1*d* in a manner that allows it to pivot upwardly and downwardly, such a connection can be achieved by means of a shaft portion and a shaft bore. The force receiving portion 41*d* is provided at the first end of the rod portion 42*d*, and it is positioned above the rotational axis of the main body portion 31*d* to enable the cam portion to push the force receiving portion 41*d* upwardly.

The driving member is a cam member 3*d*, the rotational axis of the cam member 3*d* is set in parallel to the rotational axis of the coupling member 21*d*, and the cam portion protrudes in the radial direction from the main body portion 31*d*. In this embodiment, the cam member 3*d* has two cam portions: a first cam portion 33*d* and a second cam portion 34*d*. A root portion of the cam portion is formed between the first cam portion 33*d* and the second cam portion 34*d*.

The resilient member 5*d* is supported at the second end of the rod portion 42*d* and is provided on the lower side of the second end of the rod portion 42*d*.

The detected member 6*d* is fixedly connected to the second end of the transmission member 4*d*, enabling it to pivot with the pivoting motion of the transmission member 4*d*.

The process by which the developing cartridge is detected by the detection unit 100 of the imaging apparatus will now be described with reference to FIGS. 12*a* and 12*b*.

In this embodiment, when the developing cartridge is not in use, the transmission member 4*d* is in the second position (as shown in FIG. 12*a*), the force receiving portion 41*d* abuts against the top of the first cam portion 33*d*, the resilient member 5*d* is compressed, and the detected member 6*d* has not triggered the detection unit.

When the imaging apparatus begins to operate, as the cam member 3*d* rotates, the force receiving portion 41*d* of the transmission member 4*d* moves towards the root along the first guiding surface 35*d* of the first cam portion 33*d*, and under the action of the elastic restoring force of the resilient member 5*d*, the second end of the rod portion 42*d* lifts upwardly and drives the detected member 6*d* upwardly and the detected member 6*d* then triggers the detection unit in the imaging apparatus, and the transmission member moves to the first position (the position shown in FIG. 12*b*).

As the cam member 3*d* continues rotating, the second cam portion 34*d* pushes the force receiving portion 41*d* of the transmission member 4*d*. As a result, the force receiving portion 41*d* first moves upwardly and then downwardly. Synchronously, the detected member 6*d* moves downwardly to disengage from the detection unit 100 and then upwardly contacting the detection unit 100 again, thereby completing the detection.

Figure 13A:
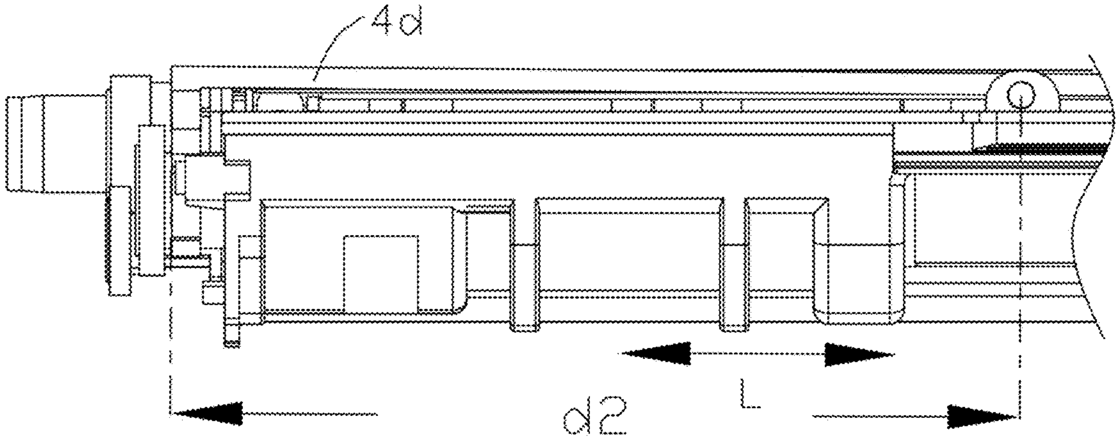
FIG. 13*a* is a schematic view of a partial structure of the developing cartridge when the transmission member in Embodiment 4 of the present disclosure is in the second position.
Figure 13B:
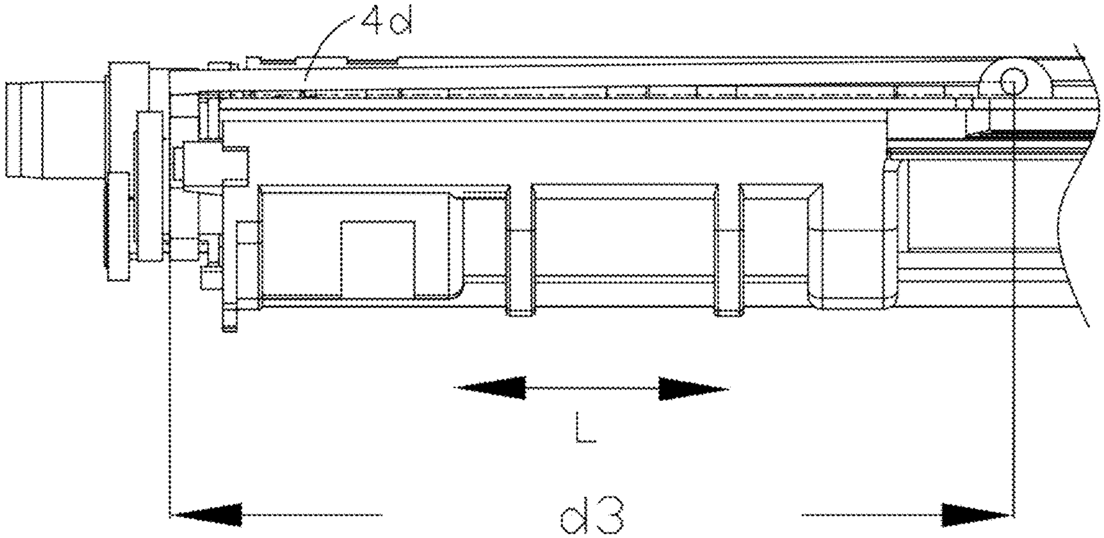
FIG. 13*b* is a schematic view of a partial structure of a developing cartridge when the transmission member in Embodiment 4 of the present disclosure is in a first position.

FIG. 13*a* illustrates the positional state of the transmission member 4*d* when it is in the second position; and FIG. 13*b* illustrates the positional state of the transmission member 4*d* when it is in the first position. As shown in FIG. 13*a*, when the transmission member 4*d* is in the second position, the distance from one end of the transmission member 4*d* to the pivoting center along the longitudinal direction L of the developing cartridge is d2. When the transmission member 4*d* pivots from the second position to the first position, as shown in FIG. 13*b*, the distance from the same end of the transmission member 4*d* to the pivoting center along the longitudinal direction L of the developing cartridge is d3, and d3 is smaller than d2, and the movement distance of this end of the transmission member 4*d* along the longitudinal direction of the developing cartridge is the difference between d2 and d3.

In some embodiments, the force receiving portion 41*d* may also be provided on the lower side of the rotational axis of the main body portion 31*d*, and the detection unit 100 is triggered when the detected portion 63*d* moves downward.

In some other embodiments, the above variations are combined as required by the design.

Embodiment 5

This embodiment is an improvement based on Embodiment 4 and its variations, and the shape and structure of the developing cartridge in Embodiment 5 are essentially the same as the developing cartridge in Embodiment 4, and the same parts will not be repeated, and the following mainly describes the differences.

Figure 14A:
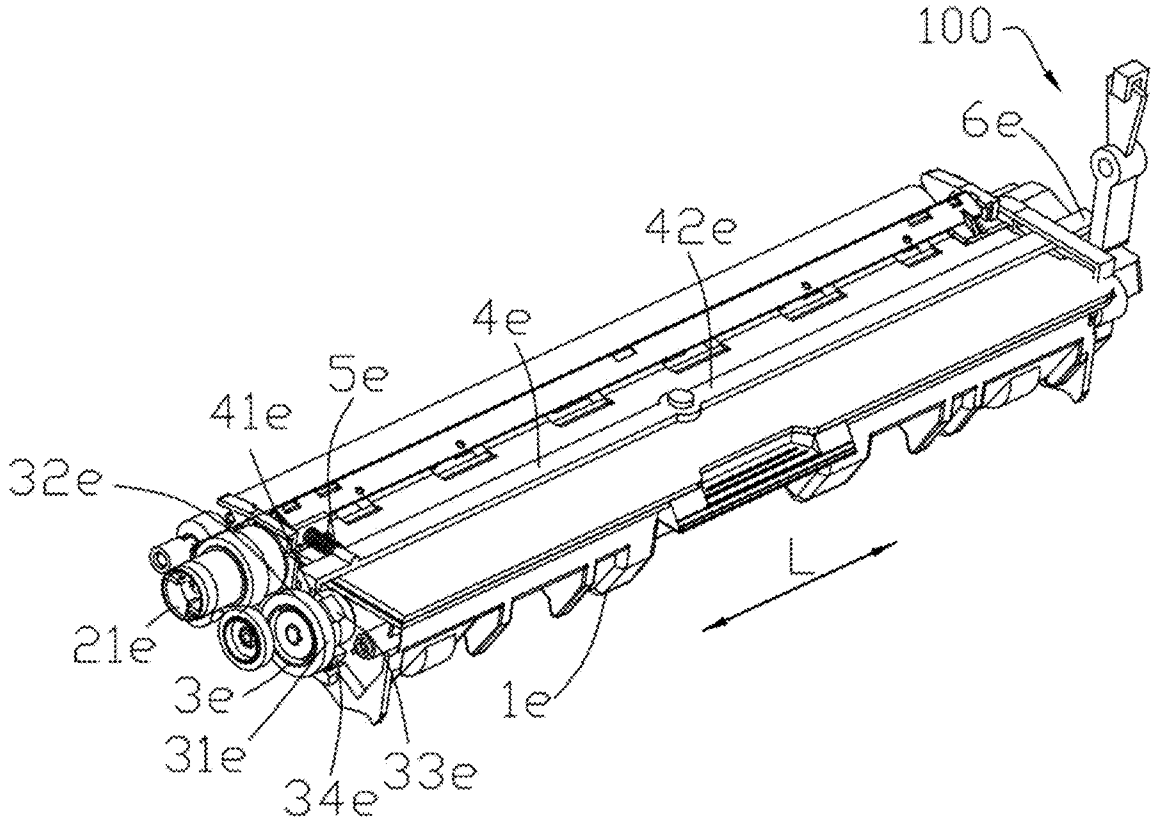
FIG. 14*a* is a schematic view of the overall structure of the developing cartridge when the transmission member in Embodiment 5 of the present disclosure is in a first position.
Figure 14B:
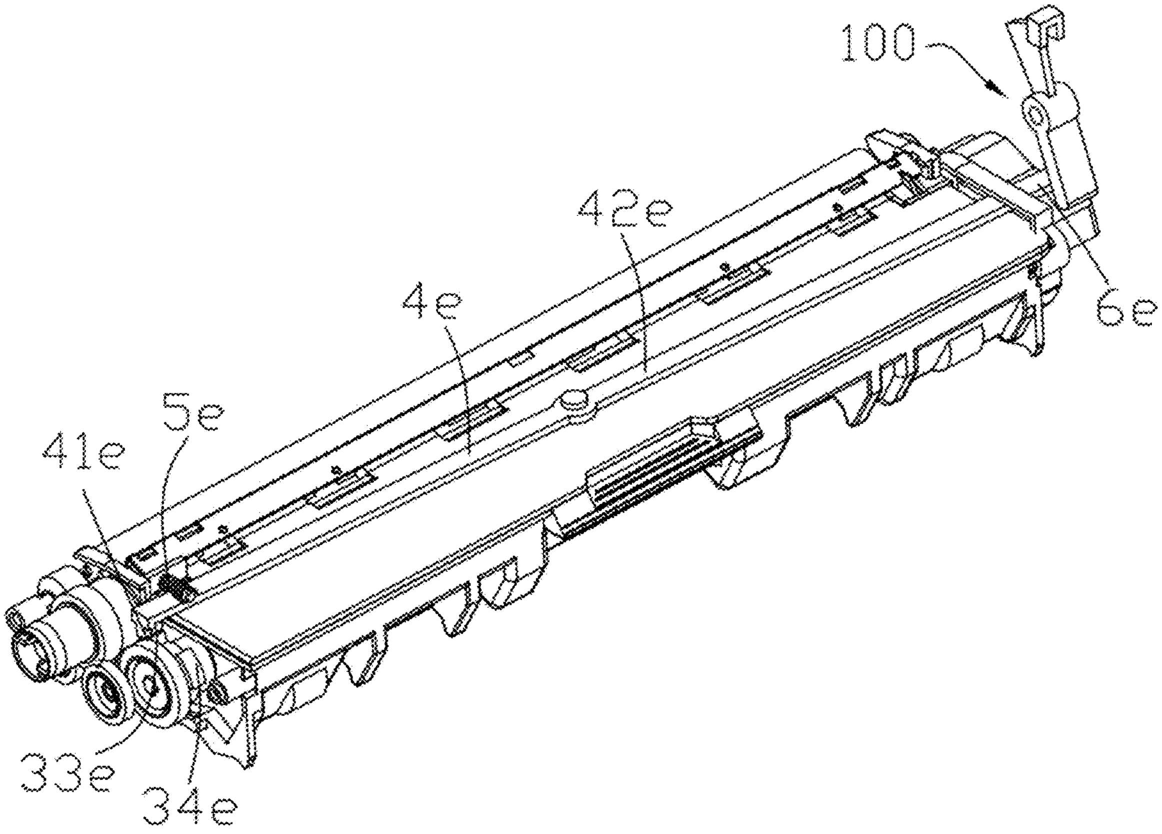
FIG. 14*b* is a schematic view of the overall structure of the developing cartridge when the transmission member in Embodiment 5 of the present disclosure is in the second position.

As shown in FIGS. 14*a* and 14*b*, in this embodiment, the transmission member 4*e* is a pivoting member configured to pivot in a front-rear direction of the developing cartridge, and at least a portion of the pivoting member is movable along the longitudinal direction L of the cartridge body 1*e*.

The transmission member 4*e* includes a force receiving portion 41*e* and a rod portion 42*e*, and the middle portion of the rod portion 42*e* is connected to the cartridge body 1*e* in a front-rear pivotal manner, such a connection can be achieved, for example, through a shaft portion and a shaft bore. The force receiving portion 41*e* is provided at the first end of the rod portion 42*e* in front of a rotational axis of the cam member 3*e*, to enable the cam portion to push the force receiving portion 41*e* forward.

The rotational axis of the cam member 3*e* is set parallel to the rotational axis of the coupling member 21*e*, and the cam portion protrudes in the radial direction from the main body portion 31*e*. In this embodiment, the cam member 3*e* likewise has a first cam portion 33*e* and a second cam portion 34*e*, and a root portion of the cam portion is formed between the first cam portion 33*e* and the second cam portion 34*e*.

The resilient member 5*e* supports the first end of the rod portion 42*e* and is provided on the front side of the first end of the rod portion 42*e*, and the detected member 6*e* is fixedly connected to the second end of the rod portion 42*e* and is configured to pivot with the pivoting motion of the transmission member 4*e*.

The process by which the developing cartridge is detected by the detection unit 100 of the imaging apparatus will now be described with reference to FIGS. 14*a* and 14*b*.

In this embodiment, when the developing cartridge is not in use, the transmission member 4*e* is in a first position (the position illustrated in FIG. 14*a*), the force receiving portion 41*e* abuts against the circumferential surface of the cam body, and the resilient member 5*e* is not compressed.

When the imaging apparatus begins to operate, the second gear portion 32*e* of the cam member 3*e* receives a drive force and rotates. Driven by the first cam portion 33*e*, the first cam portion 33*e* pushes the force receiving portion 41*e* causing the force receiving portion 41*e* to move towards the front as shown in FIG. 14*b*, the second end of the transmission member 4*e* pivots towards the rear, and the detected member 6*e* moves towards the rear with the second end of the rod portion 42*e* to contact the detection unit 100.

When the force receiving portion 41*e* of the transmission member 4*e* crosses the top of the first cam portion 33*e*, under the action of the elastic restoring force of the resilient member 5*e*, the first end of the rod portion 42*e* moves towards the rear of the developing cartridge, and the second end of the rod portion 42*e* drives the detected member 6*e* in the direction of away from the detection unit 100 towards the front, and when the second cam portion 34*e* pushes the force receiving portion 41*e*, the action process of the transmission member 4*e* and the detected member 6*e* is the same as when the first cam portion 33*e* pushes the force receiving portion 41*e*, resulting in the detection unit 100 of the imaging apparatus being triggered again, thereby completing the detection.

Figure 15A:
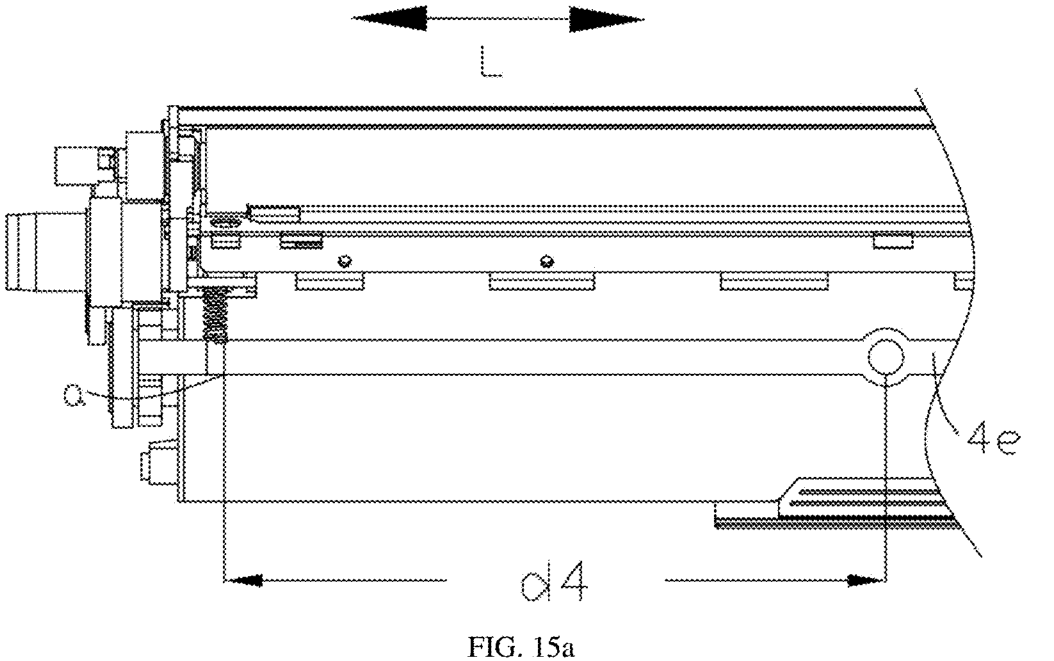
FIG. 15*a* is a schematic view of a partial structure of a developing cartridge when the transmission member in Embodiment 5 of the present disclosure is in a first position.
Figure 15B:
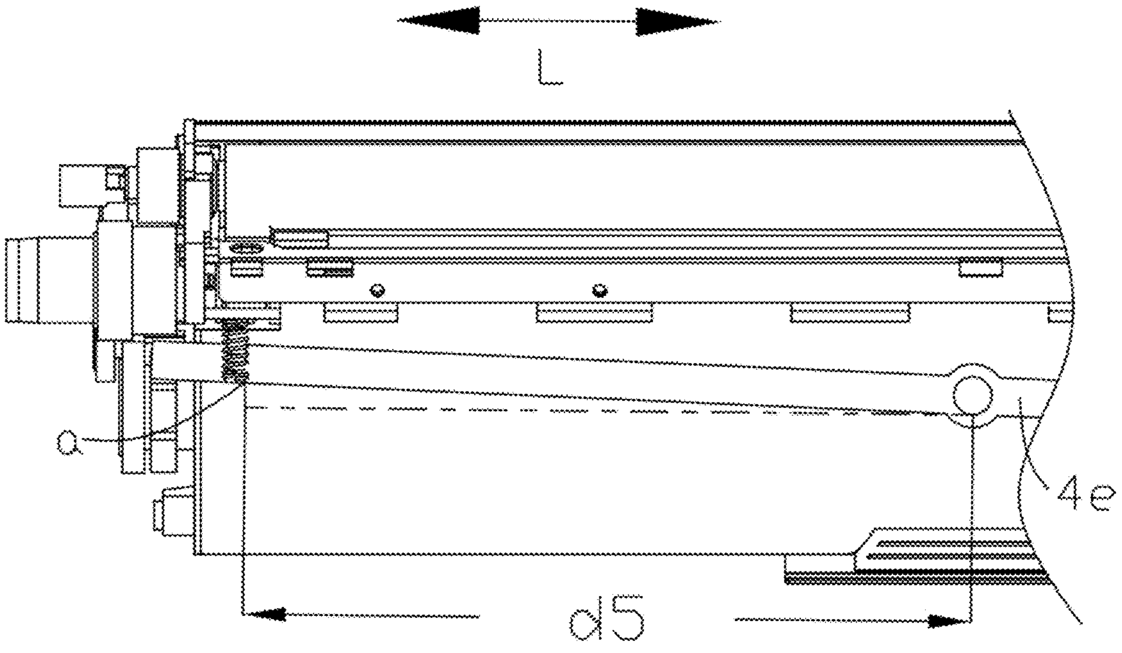
FIG. 15*b* is a schematic view of a partial structure of the developing cartridge when the transmission member in Embodiment 5 of the present disclosure is in the second position.
Figure 16:
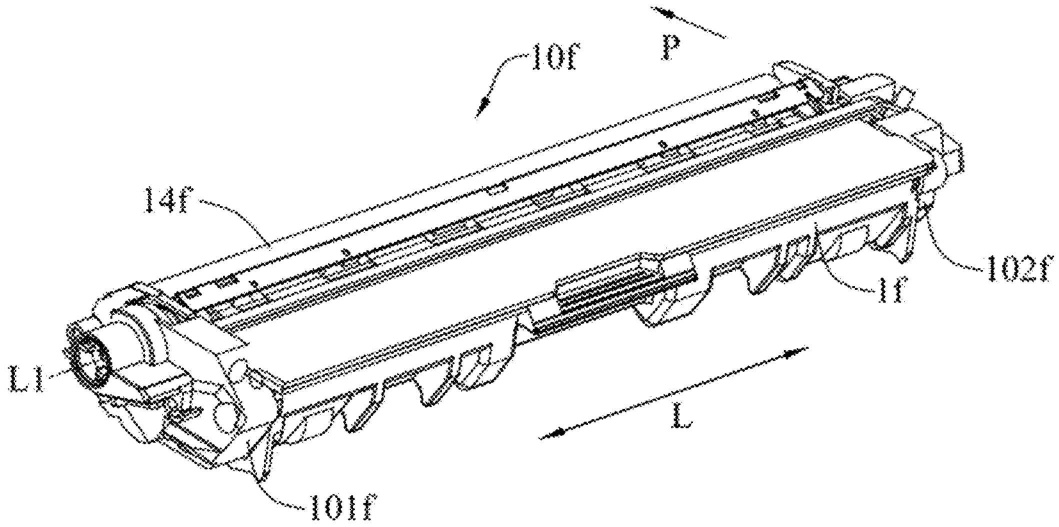
FIG. 16 is a schematic view of the overall structure of the developing cartridge in Embodiment 6 of the present disclosure.

FIG. 15*a* illustrates the positional state of the transmission member 4*e* when it is in the first position; and FIG. 15*b* illustrates the positional state of the transmission member 4*e* when it is in the second position. As shown in FIG. 15*a*, when the transmission member 4*e* is in the first position, the distance from one part a of the transmission member 4*e* to the pivoting center along the longitudinal direction L of the developing cartridge is d4. When the transmission member 4*e* pivots from the first position to the second position, as shown in FIG. 15*b*, the distance from the same part a of the transmission member 4*e* to the pivoting center along the longitudinal direction L of the developing cartridge is d5, and d5 is smaller than d4, and the movement distance of part a of the transmission member 4*e* along the longitudinal direction L of the developing cartridge is the difference between d4 and d5.

In some embodiments, the cam portion may also be configured to push the transmission member 4*e* rearwardly.

In some other embodiments, the above variations are combined as required by the design.

Embodiment 6

As shown in FIGS. 16 to 22, in Embodiment 6, the cartridge body 1*f* of the developing cartridge 10*f* is substantially cuboid in shape, with a first side wall 11*f* and a second side wall 12*f* provided externally along its longitudinal direction, and internally it is provided with a powder compartment for accommodating developer, a development roller 14*f*, a powder feed roller, and a stirring member 15*f*. The development roller 14*f* is provided on the front side of the developing cartridge 10*f* in the mounting direction P towards the imaging apparatus. It is exposed from the front side of the cartridge body 1*f* and faces the photoconductor drum when mounted in the imaging apparatus for performing development. The powder feed roller faces the development roller 14*f* and is configured to deliver developer to the development roller 14*f*. The stirring member 15*f* is configured to stir the developer accommodated in the powder compartment.

The drive force receiving unit 2*f* is provided at the first side (or the first end of the developing cartridge) along the longitudinal direction of the cartridge body 1*f* for receiving a drive force from a drive transmission member of the imaging apparatus and to transmit a rotational drive force to rotating members such as the development roller 14*f*. Specifically, in this embodiment, the drive force receiving unit 2*f* includes a coupling member 21*f*, a development roller gear 22*f*, a powder feed roller gear 23*f*, a stirring member gear 24*f*, and an idler wheel 25*f*.

Figure 17:
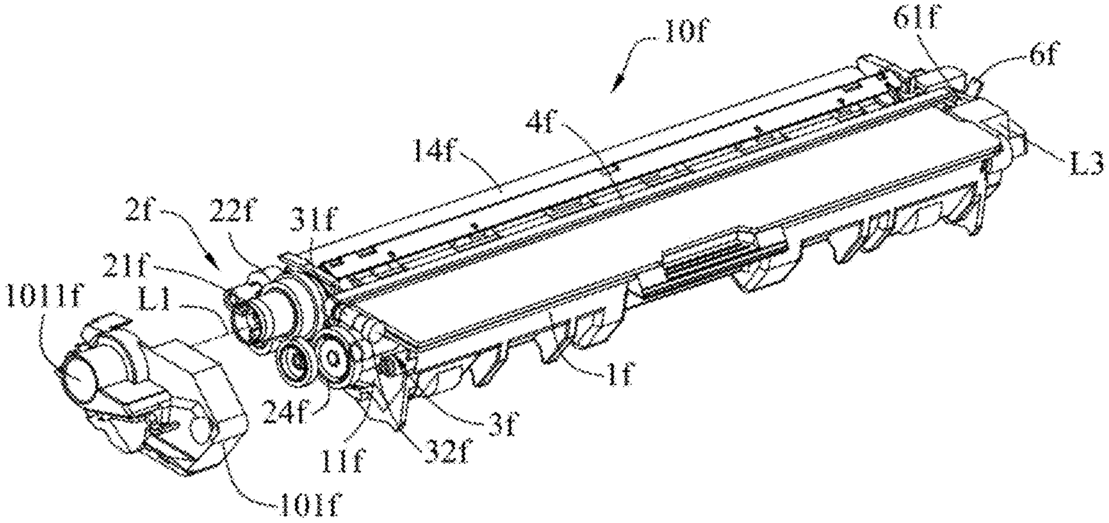
FIG. 17 is a schematic exploded view of partial structure of the developing cartridge in Embodiment 6 of the present disclosure.
Figure 18:
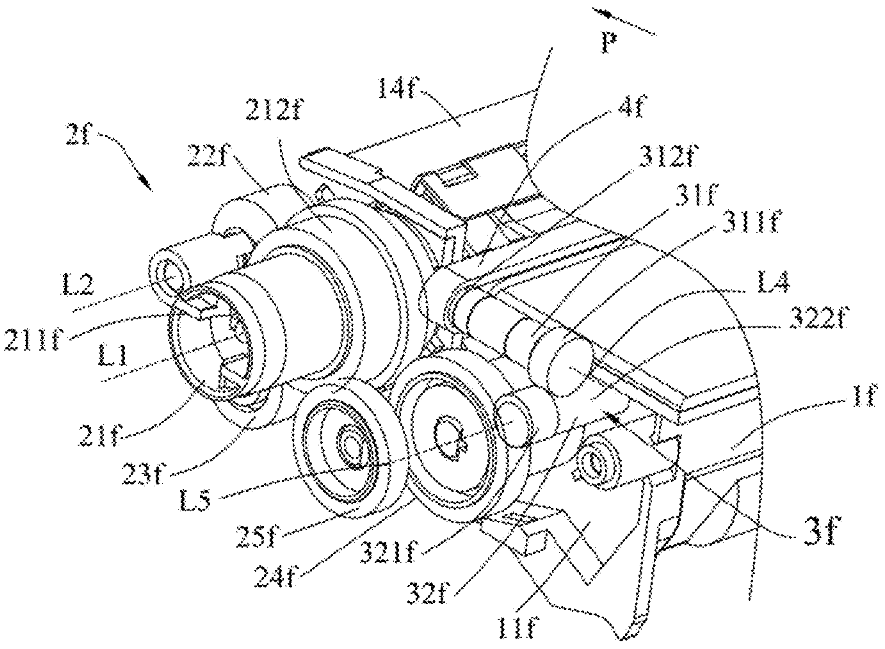
FIG. 18 is a schematic structural view of a first side of the cartridge body in Embodiment 6 of the present disclosure.
Figure 19:
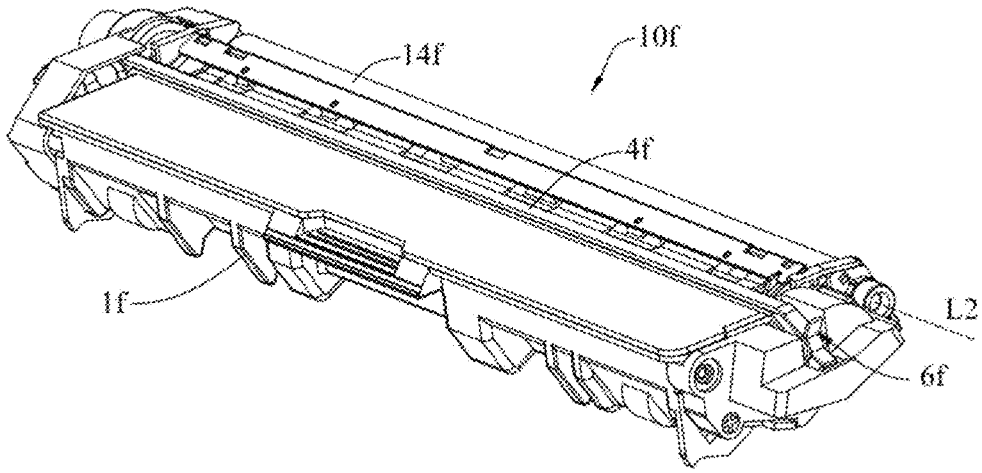
FIG. 19 is a schematic view of the overall structure of the developing cartridge in Embodiment 6 of the present disclosure at another angle.

As shown in FIGS. 17 and 18, the coupling member 21*f* is rotatably supported on the first side wall 11*f* of the cartridge body 1*f*, and its rotational axis L1 extends along the longitudinal direction of the developing cartridge 10*f* parallel to the rotational axis L2 of the development roller 14*f*. The coupling member 21*f* is provided with a drive force receiving portion 211*f* and a gear portion 212*f*, wherein the drive force receiving portion 211*f* is coupled to the drive transmission member and receives the drive force, and the gear portion 212*f* is configured to engage with the development roller gear 22*f*, the powder feed roller gear 23*f*, and the idler wheel 25*f* for transmitting rotational drive force to them. The development roller gear 22*f* and the powder feed roller gear 23*f* are provided at the ends of the development roller 14*f* and the powder feed roller, respectively, to drive the rotation of these components. The stirring member gear 24*f* is provided at an end portion of the stirring member 15*f* and engages with the idler wheel 25*f* to drive the stirring member 15*f* to rotate.

Figure 20:
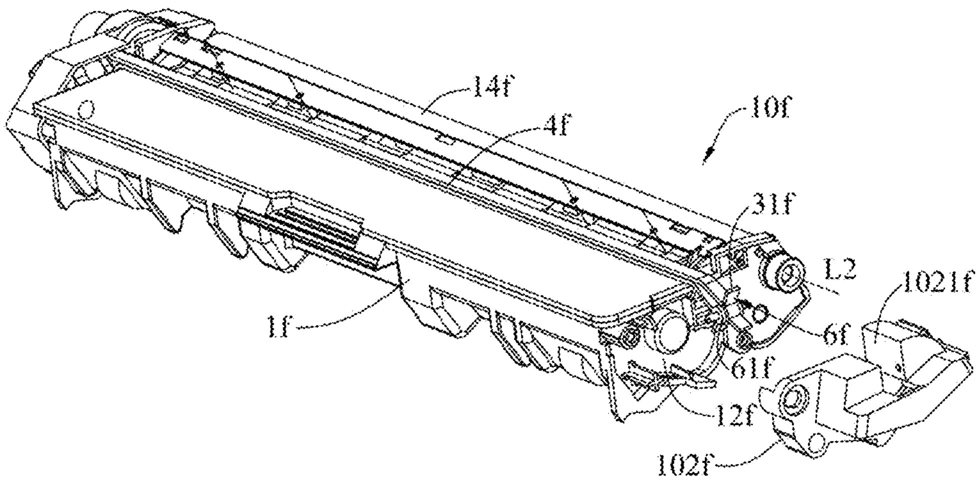
FIG. 20 is another schematic exploded view of partial structure of the developing cartridge in Embodiment 6 of the present disclosure.
Figure 21:
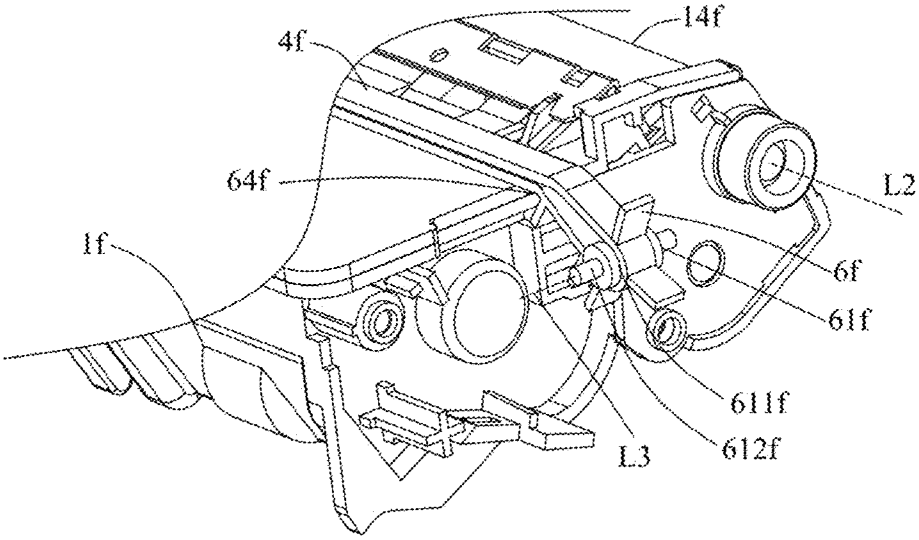
FIG. 21 is a schematic structural view of a second side of the cartridge body in Embodiment 6 of the present disclosure.
Figure 22:
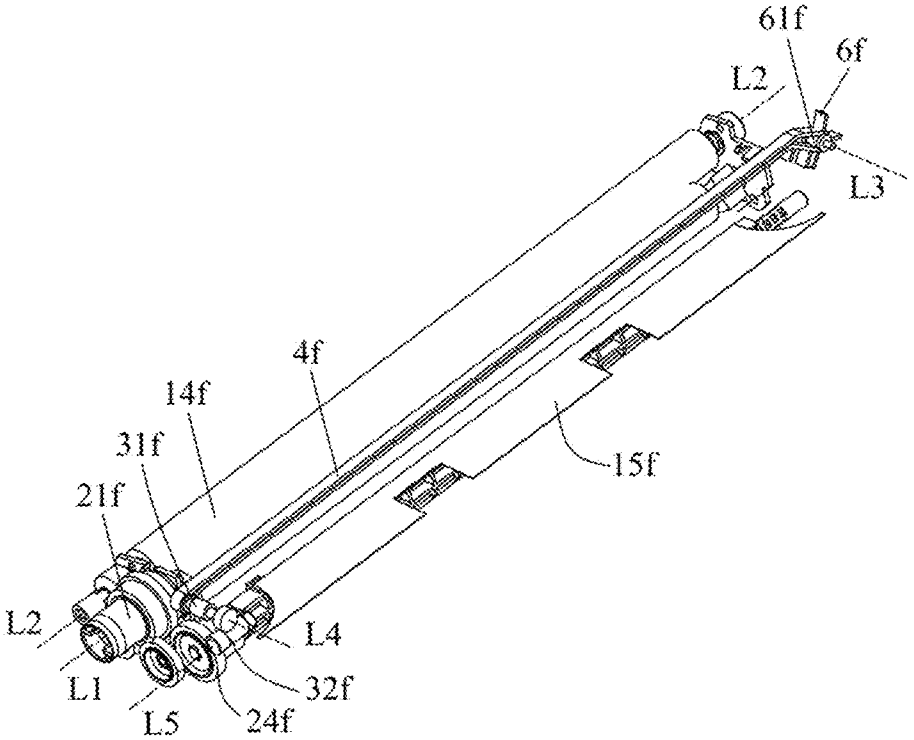
FIG. 22 is a schematic view of a partial structure of the developing cartridge in Embodiment 6 of the present disclosure.

As shown in FIGS. 20 to 22, the developing cartridge 10*f* includes the detected member 6*f* and a support member, and the support member in this embodiment is a rotating body 61*f*, the rotating body 61*f* is provided at a second end along the longitudinal direction of the developing cartridge 10*f* (located opposite to the first end along the longitudinal direction of the developing cartridge 10*f*), the rotating body 61*f* is configured to rotate by receiving a drive force transmitted from the coupling member 21*f*, and the rotating body 61*f* has a rotational axis L3 that intersects (either spatially or planarly) with the rotational axis L1 of the coupling member 21*f* and the rotational axis L2 of the development roller 14*f*, i.e., the rotational axis L3 is not parallel to the rotational axis L1 of the coupling member 21*f*. In the projection on the plane parallel to the rotational axis L1 and the rotational axis L3, the rotational axis L3 of the rotating body 61*f* intersects with the rotational axis L1 of the coupling member 21*f*. The rotating body 61*f* includes a second mounting portion 611*f* and a rotating support portion 612*f*, which allows it to be rotatably supported on the developing cartridge 10*f*.

The detected member 6*f* is movable with the rotation of the rotating body 61*f*. For example, the detected member of may rotate or pivot with the rotation of the rotating body 61*f*, and is configured to contact a transmission mechanism to cause this transmission mechanism to rotate or pivot, thereby enabling the detected member of to be detected by a detection unit in the imaging apparatus.

As shown in FIGS. 17 to 22, the developing cartridge 10*f* of the present embodiment further comprises a driving member 3*f* and a transmission member. The driving member 3*f* comprises a first transmission body 31*f* and a second transmission body 32*f*, wherein the second transmission body 32*f* is configured to receive a drive force from the drive force receiving unit 2*f*, and the first transmission body 31*f* receives a drive force from the second transmission body 32*f*; the transmission member is a flexible transmission member 4*f*, and the flexible transmission member 4*f* connects the first transmission body 31*f* to the rotating body 61*f*, to drive the rotation of the rotating body 61*f*.

Specifically, in this embodiment, the first transmission body 31*f* is provided with a first rotational force receiving portion 311*f* for receiving a rotational force and a first mounting portion 312*f* for mounting the flexible transmission member 4*f*, the first rotational force receiving portion 311*f* may be a gear portion, and the first mounting portion 312*f* is preferably a shaft portion of the first transmission body 31*f*. Preferably, the rotational axis L4 of the first transmission body 31*f* is perpendicular (including spatially perpendicular and planarly perpendicular) to the rotational axis L1 of the coupling member 21*f* and the rotational axis L2 of the development roller 14*f*, and is parallel to the mounting direction P of the developing cartridge 10*f*.

The second transmission body 32*f* is provided with a second rotational force receiving portion 321*f* and a rotational force transmitting portion 322*f*, and a rotational axis L5 of the second transmission body 32*f* is parallel to the rotational axis L1 of the coupling member 21*f* and perpendicular to the rotational axis L4 of the first transmission body 31*f*. The second rotational force receiving portion 321*f* is configured to receive a rotational drive force from the drive force receiving unit 2*f*. The rotational force transmitting portion 322*f* is connected to the first rotational force receiving portion 311*f* to transmit rotational drive force to the first transmission body 31*f*. The second rotational force receiving portion 321*f* may be a gear portion that meshes with the stirring member gear 24*f*, and the rotational force transmitting portion 322*f* may be a screw portion that cooperates with the first rotational force receiving portion 311*f*.

Preferably, the first transmission body 31*f* and the second transmission body 32*f* are both rotatably provided on a first side of the cartridge body 1*f* (a first end of the developing cartridge) on the same side of the cartridge body 1*f* as the coupling member 21*f*. The first rotational force receiving portion 311*f* of the first transmission body 31*f* is preferably a first gear portion 311*f*, and the first mounting portion 312*f* is an annular groove provided on the shaft portion of the first transmission body 31*f*, and the annular groove rotates together with the rotation of the first gear portion 311*f*.

The second rotational force receiving portion 321*f* of the second transmission body 32*f* is preferably a second gear portion 321*f*, and the rotational force transmitting portion 322*f* is preferably a screw portion 322*f* that engages with the first gear portion 311*f*.

The second transmission body 32*f* is rotatably supported on the first side wall 11*f* with its second gear portion 321*f* engaged with the stirring member gear 24*f* to receive the drive force, and the first gear portion 311*f* is disposed on the upper side of the screw portion 322*f* and engages with it to receive a drive force. Along the mounting direction P for the developing cartridge 10*f*, the first mounting portion 312*f* of the first transmission body 31*f* is located at the downstream side of the first gear portion 311*f*.

The flexible transmission member 4*f* is configured to connect the first transmission body 31*f* to the rotating body 61*f* to transmit a drive force to the rotating body 61*f*. The flexible transmission member 4*f* is movable along the longitudinal direction L of the developing cartridge 10*f*. As an example of the flexible transmission member 4*f*, it is preferably a flexible belt. The flexible belt may be a leather belt, a rubber belt, or the like. One end of the flexible belt is fitted onto the first mounting portion 312*f* of the first transmission body 31*f*, and the other end is fitted onto the second mounting portion 611*f* of the rotating body 61*f* (which may be a shaft or an annular groove on the rotating body 61*f*). This arrangement allows the flexible belt to rotate when the first transmission body 31*f* rotates, which in turn drives the rotating body 61*f*. The detected member 6*f* moves with the rotation of the rotating body 61*f*.

The flexible transmission member 4*f* is configured to move along the longitudinal direction L of the developing cartridge 10*f* while rotating. After the flexible transmission member 4*f* has moved for a predetermined distance, each portion of the flexible transmission member 4*f* is configured to move along the longitudinal direction L of the developing cartridge 10*f* for this same distance. In other words, as the flexible transmission member 4*f* rotates as a whole, each portion of the flexible transmission member 4*f* also moves along the longitudinal direction L of the developing cartridge 10*f*.

The flexible belt is configured to have friction with the first transmission body 31*f* and the second mounting portion 611*f* of the rotating body 61*f*. This allows the first transmission body 31*f* to drive the flexible belt, and in turn to drive the rotating body 61*f*. Such friction may be achieved by providing rough surfaces on the flexible belt, the first transmission body 31*f*, and the rotating body 61*f*, by adopting a mating structure of protrusions and concave portions, or by using a toothed mating structure.

In this embodiment, the first transmission body 31*f*, the second transmission body 32*f*, and the flexible transmission member 4*f* form a transmission direction-change unit, which is configured to connect the drive force receiving unit 2*f* to the rotating body 61*f* to achieve the transmission of the drive force. The transmission direction-change unit is configured to transmit the rotational force of a first object (e.g., the drive force receiving unit) in a first direction to a second object to enable movement of the second object (e.g., the detected member) in a second direction, and the rotational axis of the first object intersects with the movement direction of the second object, and this intersection may be spatial or planar. The movement may be either a linear motion or a rotational or curvilinear motion.

Further, referring to FIG. 21, in this embodiment, the transmission direction-change unit further comprises a direction change body 64*f*, specifically the direction change body may be a second support member. For example, the flexible transmission member in the form of flexible belt is supported by this second support member to bend downwardly from the upper side to change its direction. Optionally, the direction change body 64*f* may also be a roller.

In this embodiment, the detected member 6*f* is provided on an outer surface of the flexible transmission member in the form of flexible belt, and protrudes from this outer surface. There may be one or more detected members 6*f*. In this embodiment, multiple detected members 6*f* are spaced at predetermined distances apart. This arrangement allows that when the flexible belt drives the rotating body 61*f* to rotate, the detected members of may contact the transmission mechanism of the imaging apparatus, thereby causing this transmission mechanism to pivot. Consequently, the imaging apparatus can detect the developing cartridge 10*f*.

Optionally, the detected member 6*f* can also be provided on the rotating body 61*f*, allowing it to rotate with the rotating body 61*f* and to contact the transmission mechanism. Alternatively, the detected member 6*f* may be removably mounted on the flexible belt or integrally molded with it being able to protrude from the surface of the flexible belt.

In this embodiment, the developing cartridge 10*f* may also include a first end cap 101*f* and a second end cap 102*f* disposed on the first side and the second side, respectively, of the cartridge body 1*f*. The first end cap 101*f* covers an outer side of the drive force receiving unit 2*f*, and the coupling member 21*f* of the drive force receiving unit 2*f* may be exposed through a first hole portion 1011*f* in the first end cap 101*f*. The second end cap 102*f* covers the second side of the cartridge body 1*f*, and the second end cap 102*f* is provided with an exposure portion 1021*f* through which the detected member 6*f* can be exposed. The rotating body 61*f* can be rotatably supported on the inner side of the second end cap 102*f*.

The process by which the developing cartridge 10*f* is detected by the detection unit in the imaging apparatus will now be described with reference to FIG. 16-FIG. 22.

The user installs the developing cartridge 10*f* into the imaging apparatus, and the coupling member 21*f* is coupled to a drive transmission member of the imaging apparatus. When the imaging apparatus starts to operate, the coupling member 21*f* receives a rotational drive force and rotates, transmitting this rotational force to the second transmission body 32*f*. The second transmission body 32*f* then rotates and drives the rotation of the first transmission body 31*f* through its screw portion 322*f*. Subsequently, the rotation of the first transmission body 31*f* then drives the rotation of the flexible belt 4*f*, which in turn rotates the rotating body 61*f* of the detected mechanism. As a result, the detected member of on the flexible belt 4*f* contacts the transmission mechanism of the imaging apparatus and is then detected by the imaging apparatus.

In some other embodiments, the second transmission body 32*f* may receive a rotational drive force from the coupling member 21*f*, the development roller gear 22*f*, the powder feed roller gear 23*f*, or the idler wheel 25*f*, in addition to receiving a rotational drive force from the stirring member gear 24*f*.

In some other embodiments, the second transmission body 32*f* may also be one of the coupling member 21*f* having a screw portion 322*f*, the development roller gear 22*f*, the powder feed roller, or the powder feed roller gear 23*f*.

In some other embodiments, the rotational force transmitting portion and the first rotational force receiving portion may also form a bevel gear teeth transmission structure (or bevel gear teeth portion), i.e., both the first transmission body 31*f* and the second transmission body 32*f* include bevel gear structures, replacing the transmission from the screw portion to the gear with a transmission using beveled teeth. Specifically, the rotational force transmitting portion is in the form of a conical body, the top of this conical body is further away from the first side wall 11*f* than the bottom, and its sides are provided with conical teeth, and the first rotational force receiving portion is provided with conical teeth, with its rotational axis configured to be perpendicular to the rotational axis of the rotational force transmitting portion.

In some other embodiments, the rotational force transmitting portion and the first rotational force receiving portion may also be connected to each other by a linkage structure such that the rotational axes of the first transmission body and the second transmission body intersect (that is, not parallel).

In some other embodiments, the driving member and the transmission direction-change unit may also be designed without the second transmission body. In this case, the rotational axis of the first transmission body would be configured to be parallel to the rotational axis of the coupling member, with the flexible belt fitted to the first mounting portion of the first transmission body, and its other end fitted to the second mounting portion of the rotating body. Preferably, with the first transmission body and the rotating body at either end, the flexible belt can be divided into a first belt section and a second belt section, and in this variation, the first belt section and the second belt section are non-parallel and are in a cross-over state to drive the rotating body whose rotational axis intersects the rotational axis of the first transmission body to rotate. Optionally, in this configuration, the first transmission body may be the coupling member with a first mounting portion, the development roller gear, the powder feed roller gear, the stirring member gear, or the idler wheel.

In some other embodiments, the flexible transmission member may also be a chain, a rubber band, etc.

In some other embodiments, the support member may also be a component that is fixed to the cartridge body. For example, the rotating body 61*f* in this embodiment may be replaced with a fixed member. In this case, the fixed member would be fixedly connected to the cartridge body 1*f* at both ends with the fixed member having a smooth surface. The flexible belt would be fitted on this smooth surface allowing it to slide relative to the fixed member, thereby enabling the detected members disposed on the flexible belt to move and contact the transmission mechanism of the imaging apparatus.

In some other embodiments, depending on the type of imaging apparatus, the rotational axis L3 of the rotating body 61*f* and the rotational axis L1 of the coupling member 21*f* may form different angles, such as 90 degrees, 60 degrees, or 30 degrees. This configuration significantly reduces the requirements for precision and improves design flexibility.

In some other embodiments, depending on the type of imaging apparatus, the rotating body 61*f* may be provided in different positions on the developing cartridge such as on the first side, upper side, lower side or rear side of the cartridge body 1*f*, which greatly improves the flexibility of the design.

In some other embodiments, the developing cartridge may further comprise a transmission interrupting mechanism (also referred to as a clutch mechanism), the transmission interrupting mechanism is configured to interrupt the drive force transmitted from the first transmission body to the detected member, thereby causing the detected member to stop moving. Specifically, for a structure in which the first transmission body and the flexible belt are driven by friction, the transmission interrupting mechanism may include a smooth surface disposed on the inner side of the flexible transmission member in the form of flexible belt. When this smooth surface moves to a position contacting the first transmission body 31*f*, the first transmission body 31*f* becomes unable to transmit the drive force to the flexible belt, resulting in the cessation of the flexible belt's rotation.

In some other embodiments, the above variations may be combined as needed to meet the design requirements.

The developing cartridge having the above-described structure utilizes the flexible transmission member for drive force transmission, this allows for more diverse positioning options for the detected member. Moreover, the rotational axis L3 of the rotating body can be set at an angle to the rotational axis L1 of the coupling member 21*f*, i.e., it does not need to be parallel, with the angle adjustable as required. This also enhances the flexibility in positioning of the detection unit in the imaging apparatus. The developing cartridge 10*f* having the above-described structure effectively solves the problem of speed differences arising from long-distance transmission by adopting the flexible transmission member 4*f*.

Compared to the direct transmission of drive force through gears to the rotating body 61*f*, the developing cartridge 10*f* having the above structure requires less stringent consideration of transmission ratios. When the rotational speed of the rotating body 61*f* needs to be controlled, the gear-based design requires a plurality of gears for deceleration, which would increase the number of parts and raises the production costs. With the flexible transmission member 4*f* connecting the rotating body 61*f* and the first transmission body 31*f*, when the speed of transmission needs to be reduced, it is only necessary to adjust the diameters of the rotating body 61*f* and the first transmission body 31*f*, greatly reducing design costs.

The developing cartridge 10*f* having the structure described above allows for multiple contacts of the transmission mechanism of the imaging apparatus. This can be achieved by providing a plurality of detected members of on the flexible transmission member or on the rotating body 61*f*, or by increasing the number of revolutions. When longer intervals between each contact are required, such a structure is also advantageous.

Embodiment 7

Figure 23:
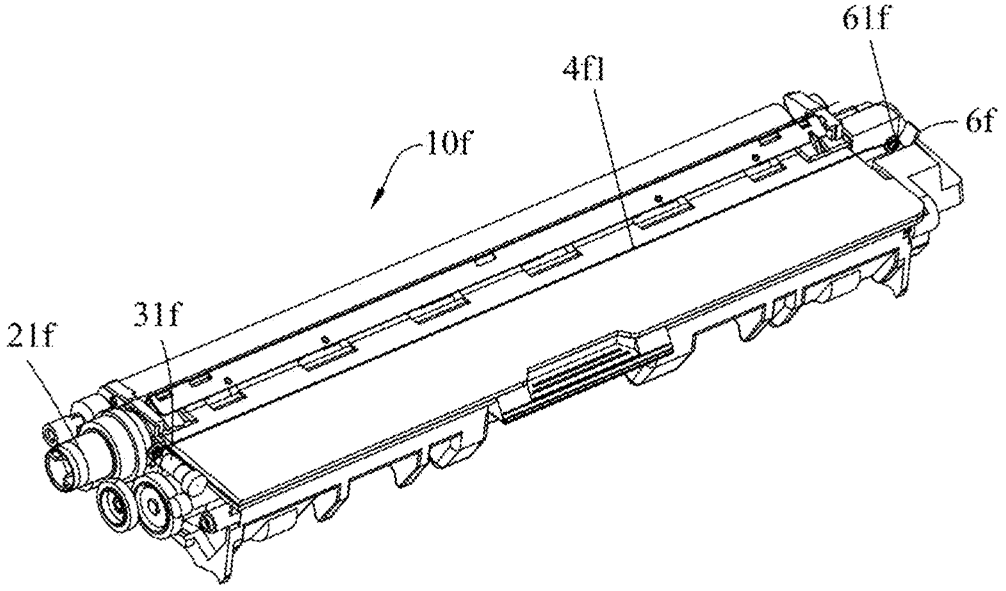
FIG. 23 is a schematic view of the overall structure of the developing cartridge in Embodiment 7 of the present disclosure.
Figure 24:
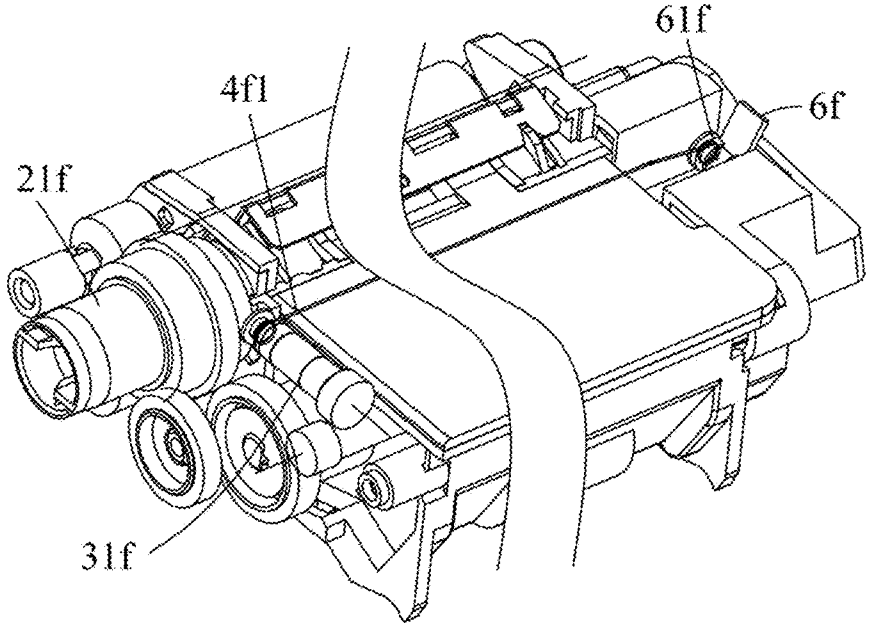
FIG. 24 is a schematic view of a partial structure of the developing cartridge in Embodiment 7 of the present disclosure.

As shown in FIGS. 23 and 24, the shape and structure of the developing cartridge in the present embodiment are basically the same as those of the developing cartridge in Embodiment 6, and the similarities will not be repeated, and the following mainly describes the different aspects.

The flexible transmission member in the present embodiment is a flexible cord 4*f*1, one end of the flexible cord 4*f*1 is wound on or attached to the first transmission body 31*f*, and the other end is wound on the rotating body 61*f*, and the number of rotational revolutions of the rotating body 61*f* can be controlled by adjusting the number of turns of the flexible cord 4*f*1 wound on the rotating body 61*f*. The flexible cord 4*f*1 is wound in opposite directions on the first transmission body 31*f* and the rotating body 61*f*.

When the developing cartridge 10*f* is mounted in the imaging apparatus and the coupling member 21*f* receives the drive force and rotates, the first transmission body 31*f* receives the drive force and rotates and pulls the flexible cord 4*f*1. Due to the pulling of the flexible cord 4*f*1, the rotating body 61*f* starts to rotate, which causes the detected member 6*f* disposed on the rotating body 61*f* to contact the transmission mechanism of the imaging apparatus. In this structure, as the first transmission body 31*f* and the rotating body 61*f* rotate, the number of turns wound on the first transmission body 31*f* increases while the number of turns wound on the rotating body 61*f* decreases.

In some other embodiments, a direction changing body may also be provided between the first transmission body 31*f* and the rotating body 61*f* to change the direction of the transmission. Specifically, the direction changing body may be a roller around which the flexible cord 4*f*1 changes the direction of the transmission before connecting to the rotating body 61*f*. Optionally, the direction changing body may also be a fixed second support member with the second support member acting as a fulcrum around which the flexible cord 4*f*1 wraps around to change its direction.

In some other embodiments, the flexible transmission member may also be a metal wire such as steel wire, iron wire, or other metal wires, or a chain.

In some other embodiments, the developing cartridge may further comprise a transmission interrupting mechanism (clutch mechanism), and the transmission interrupting mechanism is configured to interrupt the drive force transmitted from the drive force receiving unit to the detected member, causing the detected member to stop moving. In this embodiment, the flexible cord or steel wire may not be attached to the rotating body 61*f*. As a result, as the rotating body 61*f* rotates, eventually the flexible cord falls off the rotating body 61*f*, causing the rotating body to stop rotating, and the detected member stops rotating.

For other structures and variations of the developing cartridge in Embodiment 7, please refer to the description in Embodiment 6, which will not be repeated here.

Embodiment 8

This embodiment is an improvement based on Embodiment 1 and its variations. The shape and structure of the developing cartridge in Embodiment 8 are essentially the same as the developing cartridge in Embodiment 1. The same parts will not be described again; the following mainly focuses on the differences.

Figure 25:
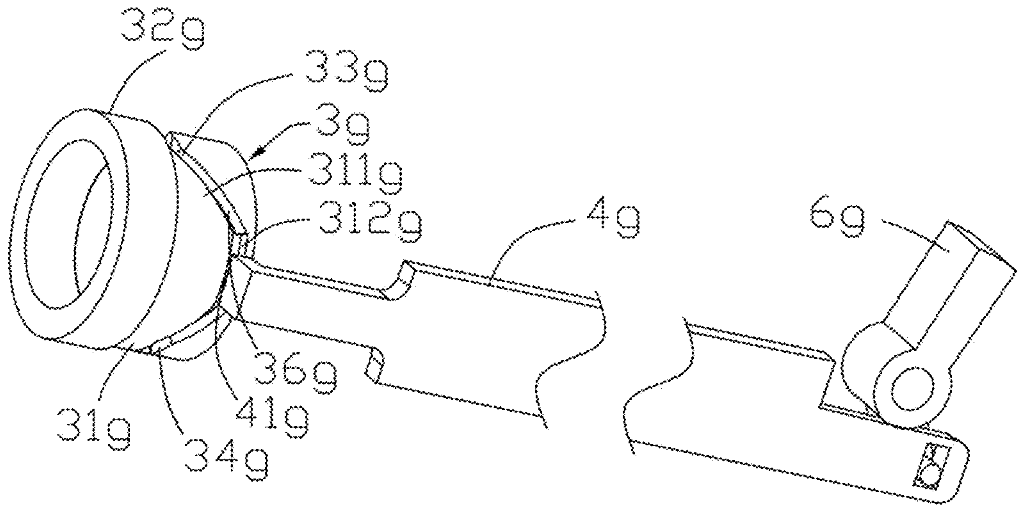
FIG. 25 is a view of the assembly relationship of the driving member, the transmission member, and the detected member in Embodiment 8 of the present disclosure.

As shown in FIG. 25, in this embodiment, the driving member is a grooved cam wheel member 3*g* having a rotational axis parallel to the rotational axis of the coupling member. The grooved cam wheel member 3*g* includes a cylindrical main body portion 31*g*, a guide groove 311*g* provided on a circumferential outer surface of the main body portion 31*g*, and a second gear portion 32*g* that is configured to engage with the drive force receiving unit.

The action portion of the driving member is provided within the guide groove 311*g* (or forms a portion of the guide groove), and the force receiving portion 41*g* of the transmission member 4*g* is embedded into the guide groove 311*g* along the radial direction of the main body portion 31*g* and is configured to move along the guide groove 311*g* as the grooved cam wheel member 3*g* rotates. Preferably, the embedded portion may be in the form of a cylinder that matches the guide groove 311*g*.

In this embodiment, there are two action portions: a first action portion 33*g* and a second action portion 34*g*, both having the same shape and structure.

Taking the first action portion 33*g* as an example, it extends along a direction away from the first side wall along the direction of the rotational axis of the grooved cam wheel member 3*g* in order to push the force receiving portion 41*g* of the transmission member 4*g* when the grooved cam wheel member 3*g* rotates.

The process by which the developing cartridge is detected by the detection unit in the imaging apparatus will now be described with reference to FIG. 25.

In this embodiment, when the developing cartridge is not in use, the force receiving portion 41*g* of the transmission member 4*g* abuts against the side wall 312*g* of the guide groove 311*g*, and the detected member 6*g* is in a state separated from the detection unit.

When the grooved cam wheel member 3*g* receives the drive force and rotates, the force receiving portion 41*g* is pushed by the first action portion 33*g* first moving from the root to the top of the first action portion 33*g*, then moving from the top back to the root of the first action portion 33*g*. As a result, the transmission member 4*g* slides to the left and then to the right, and synchronously, the detected member 6*g* rotates and then returns to its initial position after contacting the detection unit in the imaging apparatus. As the grooved cam wheel member 3*g* continues to rotate, the second action portion 34*g* pushes the force receiving portion 41*g* and repeats the cooperative action process between the first action portion 33*g* and the force receiving portion 41*g*. This allows the detected member 6*g* to contact the detection unit again and complete the detection.

The developing cartridge having the above structure allows for the omission of the resilient member. The transmission member relies on the guide groove to prevent the force receiving portion from detaching from the grooved cam wheel member 3*g*.

Embodiment 9

This embodiment is an improvement based on Embodiment 4 and its variations, and the shape and structure of the developing cartridge in Embodiment 9 are essentially the same as the developing cartridge in Embodiment 4, and the same parts will not be repeated, and the following mainly describes the differences.

Figure 26:
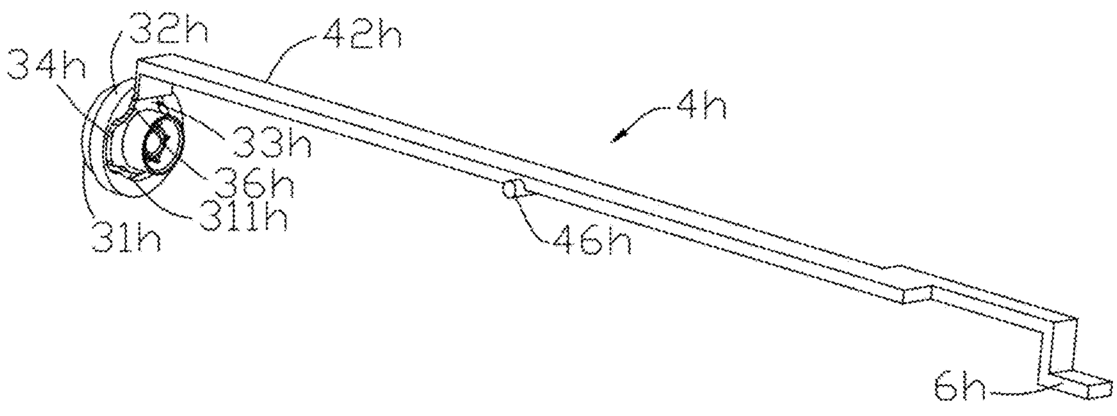
FIG. 26 is a view of the assembly relationship of the driving member, the transmission member, and the detected member in Embodiment 9 of the present disclosure.
Figure 27:
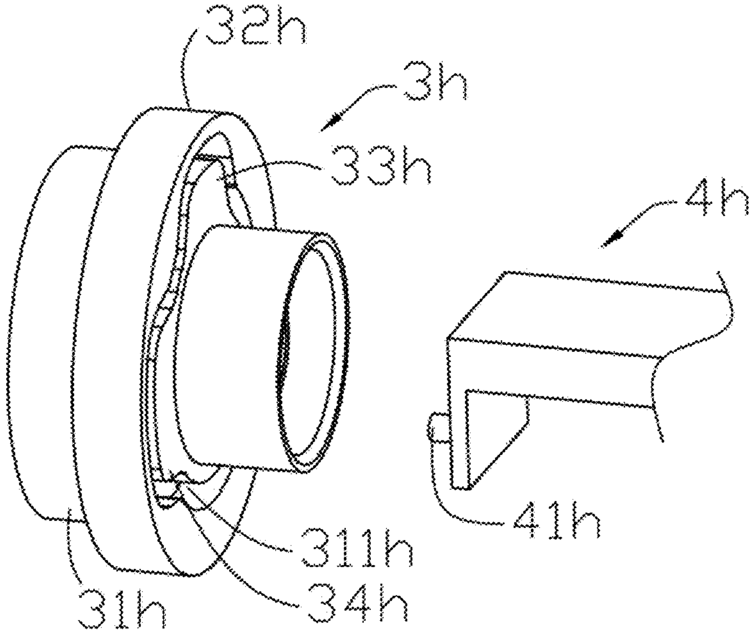
FIG. 27 is a schematic view of the partial structure of the driving member and transmission member in Embodiment 9 of the present disclosure.
Figure 28:
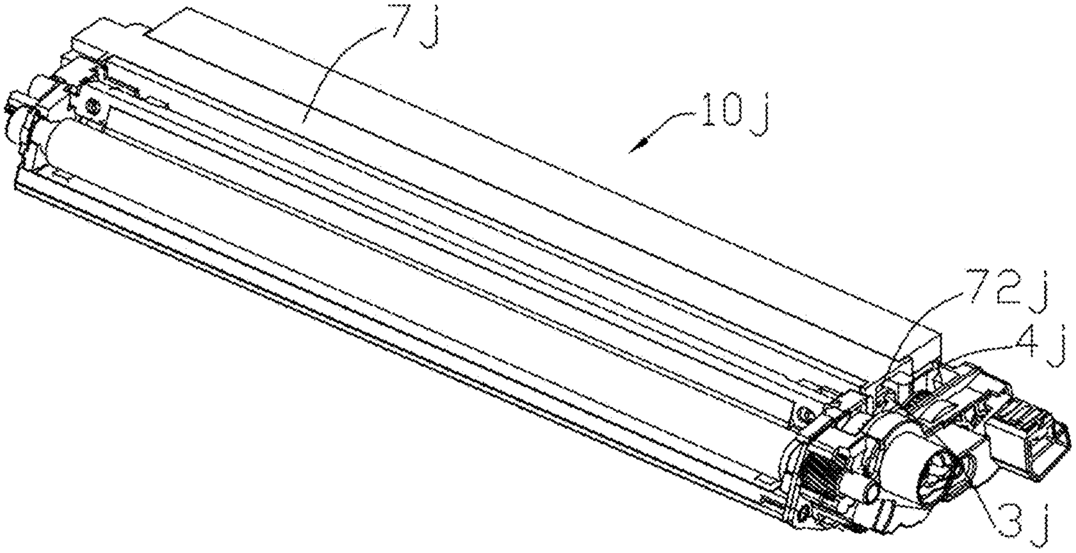
FIG. 28 is a schematic view of the overall structure of the developing cartridge in Embodiment 10 of the present disclosure.
Figure 29:
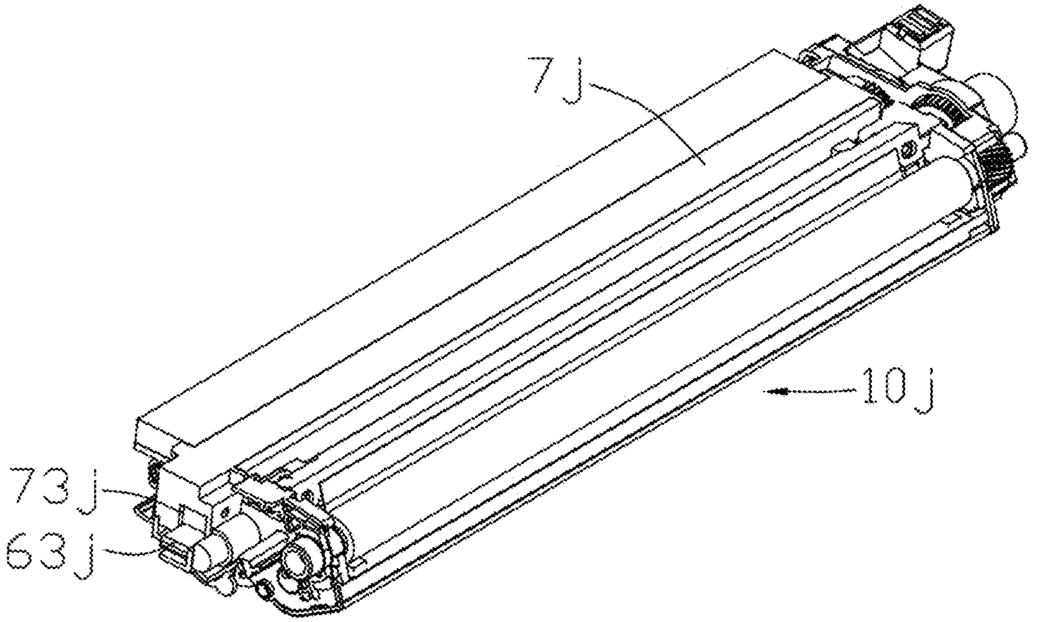
FIG. 29 is a schematic view of the overall structure of another view of the developing cartridge in Embodiment 10 of the present disclosure.
Figure 30:
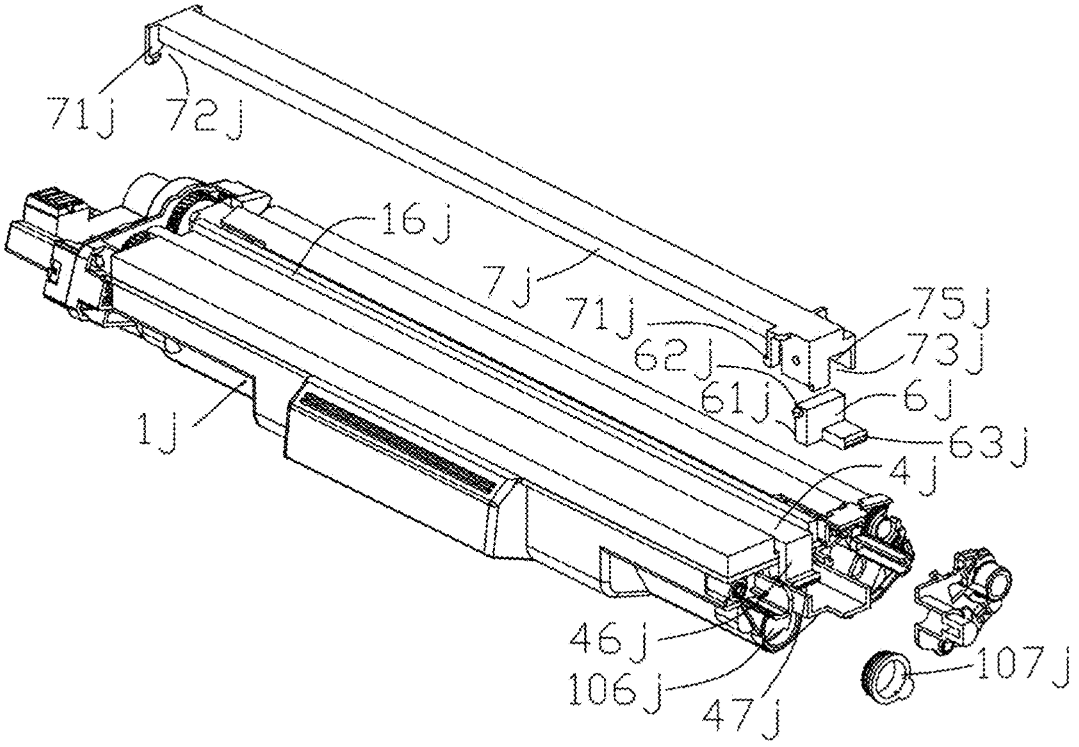
FIG. 30 is a schematic exploded view of partial structure of the developing cartridge in Embodiment 10 of the present disclosure.
Figure 31:
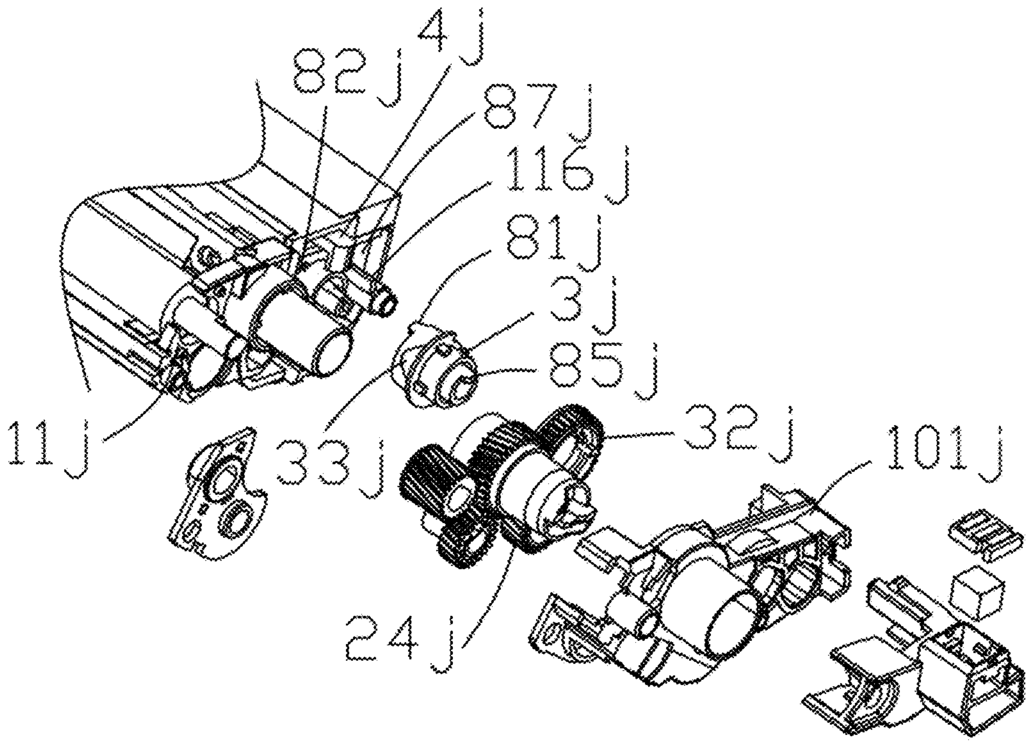
FIG. 31 is a schematic exploded view of partial structure of a first end of the developing cartridge in Embodiment 10 of the present disclosure.
Figure 32:
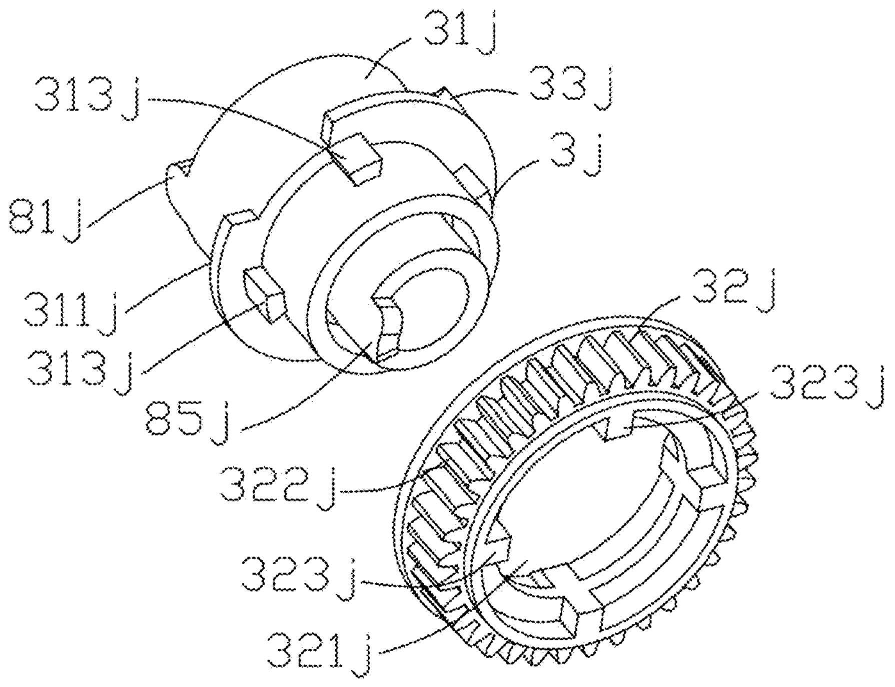
FIG. 32 is a schematic view of the structure of the cam member and the second gear member in Embodiment 10 of the present disclosure.
Figure 33:
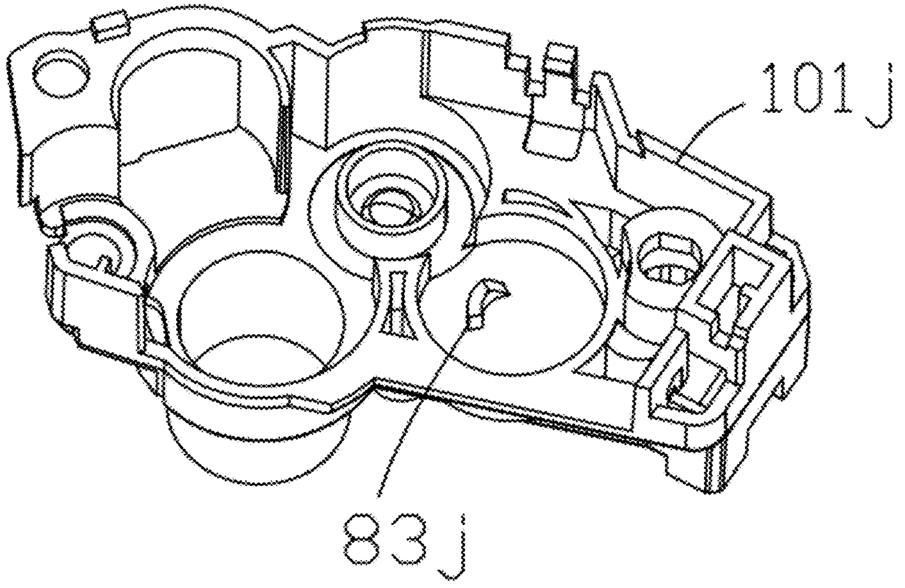
FIG. 33 is a schematic structural view of the first end cap and the second protruding portion of the Embodiment 10 of the present disclosure.
Figure 34:
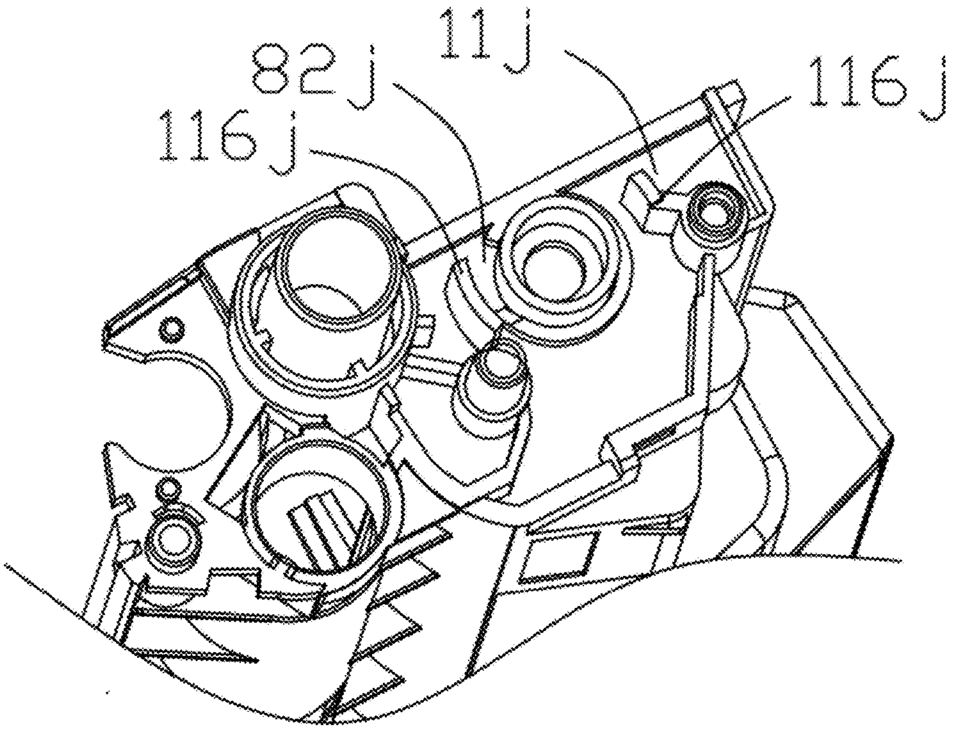
FIG. 34 is a schematic view of the structure of a first end of the cartridge body in Embodiment 10 of the present disclosure.

As shown in FIGS. 26 and 27, in this embodiment, the driving member is a grooved cam wheel member 3*h* having a rotational axis parallel to the rotational axis of the coupling member. The grooved cam wheel member 3*h* comprises a cylindrical main body portion 31*h*. A guide groove 311*h* is provided on an end face of the main body portion 31*h* near the first side wall, and a second gear portion 32*h* configured to engage with the drive force receiving unit is provided on its circumferential outer face.

The action portion of the driving member is provided within the guide groove 311*h* (or forms a portion of the guide groove). The force receiving portion 41*h* of the transmission member 4*h* is embedded into the guide groove 311*h* along the direction of the rotational axis of the main body portion 31*h* and is configured to move along the guide groove 311*h* when the grooved cam wheel member 3*h* rotates.

In this embodiment, there are two action portions: a first action portion 33*h* and a second action portion 34*h* with the same shape and structure. Taking the first action portion 33*h* as an example, the first action portion 33*h* extends along the radial direction from the main body portion 31*h* in order to push the force receiving portion 41*h* of the transmission member 4*h* when the grooved cam wheel member 3*h* rotates.

The transmission member 4*h* is configured to pivot up and down around a shaft portion 46*h* located in its center, which includes a rod portion 42*h* and a force receiving portion 41*h*, and the end of the rod portion 42*h* located remote from the grooved cam wheel member 3*h* is fixedly connected to the detected member 6*h*.

The process by which the developing cartridge is detected by the detection unit in the imaging apparatus will now be described with reference to FIGS. 26 and 27.

In this embodiment, when the developing cartridge is not in use, the transmission member 4*h* is in the second position where the force receiving portion 41*h* is located at the top of the first action portion 33*h*, and the detected member 6*h* is in a state where it has not contacted the detection unit.

When the grooved cam wheel member 3*h* receives a drive force and rotates, the force receiving portion 41*h* moves from the top of the first action portion 33*h* towards the root of the first action portion 33*h*, the first end of the rod portion 42*h* moves downwardly, and the second end of the rod portion lifts upwardly and drives the detected member 6*h* upwardly. As a result, the detected member 6*h* triggers the detection unit in the imaging apparatus.

As the second action portion 34*h* pushes the force receiving portion 41*h* of the transmission member 4*h*, the force receiving portion 41*h* first moves upwardly and then downwardly, and synchronously, the detected member 6*h* moves downwardly to disengage from the detection unit and then moves upwardly to contact the detection unit again, thereby completing the detection.

The developing cartridge having the above-described structure allows for the omitting of the resilient member, and the transmission member relies on the restrictive effect of the guide groove to prevent it from disengaging from the grooved cam wheel member 3*h*.

Optionally, the number and shape of the action portions may be varied as needed. For example, one or more action portions may be provided, or a plurality of action portions may have different shapes.

Embodiment 10

This embodiment is an improvement based on Embodiment 1 and its variations, and the shape and structure of the developing cartridge 10*j* in Embodiment 10 are essentially the same as that of the developing cartridge 10*a* in Embodiment 1, and the same parts will not be repeated, and the following mainly describes the differences.

As shown in FIGS. 28 to 34, the driving member in the present embodiment is configured as a cam member, and the developing cartridge 10*j* is provided with a clutch mechanism for interrupting the transmission of the drive force to the detected member 6*j* at a predetermined time. The clutch mechanism includes a forcing structure and a retracting structure, the forcing structure is designed to force at least a portion of the cam member 3*j* to move, and the retracting structure provides a displacement space for this portion of the cam member to move. Specifically, the retracting structure includes a first protruding portion 81*j* provided at the end of the cam member 3*j* near the first side wall 11*j* and a yielding portion 82*j* disposed on the support member 87*j*. Specifically, the yielding portion is in the form of an opening 82*j*.

The first protruding portion 81*j* can move against the surface of the support member 87*j*, and when the first protruding portion 81*j* moves to the opening 82*j*, it falls into the opening 82*j* under the action of the forcing structure, causing the cam member 3*j* to move.

The support member 87*j* is fixedly connected to the first side wall or replaces it. The forcing structure includes a second protruding portion 83*j* provided on the first end cap 101*j* and a third protruding portion 85*j* provided on the end of the cam member 3*j* away from the first side wall 11*j*. The second protruding portion 83*j* and the third protruding portion 85*j* protrude in opposite directions. This arrangement allows that upon rotation of the cam member 3*j*, the third protruding portion 85*j* moves along the pressure surface of the second protruding portion 83*j* towards the top of the second protruding portion 83*j*, thereby forcing the cam member 3*j* to move along the longitudinal direction of the developing cartridge 10*j* and interrupts the transmission of the drive force.

The interplay between the forcing structure and the retracting structure is such that the first protruding portion 81*j* moves first to the opening 82*j* before the second protruding portion 83*j* pushes the third protruding portion 85*j*. Alternatively, as the second protruding portion 83*j* pushes the third protruding portion 85*j*, the first protruding portion 81*j* may move to the opening 82*j* at the same time. This structure allows the developing cartridge 10*j* to omit the resilient member. The structure is simpler, and assembly is more convenient.

The cam member 3*j* in this embodiment further includes a main body portion 31*j*, a cam portion 33*j*, and a rotational force receiving portion 313*j*, the main body portion 31*j* is substantially cylindrical in shape, with a flange portion 311*j* provided on it outer circumference. A third protruding portion 85*j* protrudes outwardly from the side of the cam member 3*j* away from the first side wall 11*j*, and is designed to abut against the inner side of the first end cap 101*j*. The first protruding portion 81*j* protrudes from the main body portion 31*j* in a direction towards the first side wall 11*j*. The cam portion 33*j* is provided on a side of the flange portion 311*j* proximate to the first side wall 11*j*, and protrudes in the direction towards the first side wall 11*j* in order to form a fit with the transmission member 4*j*. The rotational force receiving portion 313*j* is configured to protrude from the circumferential outer side of the main body portion 31*j* in the radial direction of the main body portion 31*j* to receive the drive force. The second gear member 32*j* includes a hollow portion 321*j*, a gear portion 322*j*, and a rotational force transmitting portion 323*j*, and the hollow portion 321*j* is cylindrically hollow, which is configured to be fitted onto the outer side of the cam member 3*j*.

The rotational force transmitting portion 323*j* protrudes from the inner wall of the hollow portion 321*j* in the radial direction of the second gear member 32*j*, and is configured to engage with the rotational force receiving portion 313*j* of the cam member 3*j*. This allows the rotational force transmitting portion 323*j* to drive the rotational force receiving portion 313*j* to rotate when the second gear member 32*j* rotates, and when the cam member 3*j* moves along the longitudinal direction of the developing cartridge 10*j*, the rotational force transmitting portion 323*j* and the rotational force receiving portion 313*j* become disengaged along the longitudinal direction of the developing cartridge, thereby interrupting the transmission of the rotational drive force.

In this embodiment, the developing cartridge further comprises a restriction portion that restricts the movement of the second gear member 32*j*. Specifically, the restriction portion is in the form of a protrusion 116*j* disposed on the first side wall 11*j*, the protrusion 116*j* abuts against the end of the second gear member 32*j* closest to the first side wall 11*j*. It is configured to restrict the second gear member 32*j* from moving with the cam member 3*j* during relative movement between the cam member 3*j* and the second gear member 32*j*. This enables a better separation between the rotational force transmitting portion 323*j* and the rotational force receiving portion 313*j*. Preferably, a plurality of restriction portions may be provided on both the end cap and the side wall.

The upper side of the cartridge body 1*j* is provided with a sliding groove portion 16*j*, and the transmission member 4*j* is slidably accommodated in the sliding groove portion 16*j*. Specifically, the upper surface of the transmission member 4*j* is flush with or lower than the upper surface of the cartridge body 1*j*.

The developing cartridge 10*j* further comprises a covering portion 7*j* that at least partially covers the transmission member 4*j*, the covering portion 7*j* in the present embodiment is in the form of an elongated strip that is configured to be snapped onto the cartridge body 1*j* to cover the transmission member 4*j*.

Specifically, the covering portion 7*j* is provided with snap-fit portions 71*j*, a first exposed portion 72*j*, and a second exposed portion 73*j* at its ends. The snap-fit portions 71*j* disposed at the ends are snapped onto the cartridge body 1*j* to secure the covering portion 7*j*. The first exposed portion 72*j* and the second exposed portion 73*j* are configured as openings. One end of the transmission member 4*j* can extend through the first exposed portion 72*j* to cooperate with the cam member 3*j*. The detected portion 63*j* of the detected member 6*j* can be exposed through the second exposed portion 73*j* in order to cooperate with the detection unit in the imaging apparatus.

The detected member 6*j* is supported on the second end of the covering portion 7*j* in a manner allowing it to pivot in the up-down direction, and the second end of the covering portion 7*j* is provided with an accommodating cavity 75*j* to accommodate a portion of the detected member 6*j*.

Specifically, the connection portion 62*j* of the detected member 6*j* is pivotally attached to the covering portion 7*j*, the pivot axis of the connection portion 62*j* is located above the force receiving portion 61*j*. The detected portion 63*j* is located below the pivot axis and below the transmission mechanism 200*j* of the detection unit when mounted in the imaging apparatus. The detected portion 63*j* can trigger the transmission mechanism 200*j* when it pivots up and down.

In this embodiment, the second end of the transmission member 4*j* further comprises a bending section 46*j* which bends downwardly and connects to a drive portion 47*j*. The drive portion 47*j* of the transmission member 4*j* extends along the longitudinal direction of the developing cartridge 10*j*. The detected member 6*j* is pivotally supported on the covering portion 7*j*, and the force receiving portion 61*j* is located below the pivot axis of the connection portion 62*j*. When the drive portion 47*j* of the transmission member 4*j* triggers the force receiving portion 61*j* of the detected member 6*j*, the detected member 6*j* pivots. As a result, the detected portion 63*j* moves upwardly to trigger the detection unit so as to be able to be detected.

In this embodiment, when the developing cartridge 10*j* is mounted in the imaging apparatus, the detected portion 63*j* of the detected member 6*j* is pressed against the transmission mechanism 200*j* (which has a resilient force). As a result, the force receiving portion 61*j* of the detected member 6*j* pushes the transmission member 4*j* towards the right side causing the transmission member 4*j* to be firmly pressed against the flange portion 311*j* of the cam member 3*j*.

When the cam portion 33*j* of the cam member 3*j* pushes the transmission member 4*j*, the transmission member 4*j* moves towards the right side of the developing cartridge 10*j*, which in turn pushes the detected member 6*j* to pivot. Consequently, the detected portion 63*j* of the detected member 6*j* moves upwardly pushing against the rotation of the transmission mechanism 200*j* of the detection unit enabling detection.

When the force receiving portion 41*j* of the transmission member 4*j* moves from the top of the cam portion 33*j* towards the root, the detected member 6*j* pushes the transmission member 4*j* towards the left side of the developing cartridge 10*j* under the action of the pressing force of the transmission mechanism 200*j*.

The interaction of the components of the developing cartridge 10*j* as it is detected by the imaging apparatus will now be described with reference to FIGS. 35*a* to 35*c*.

Figure 35A:
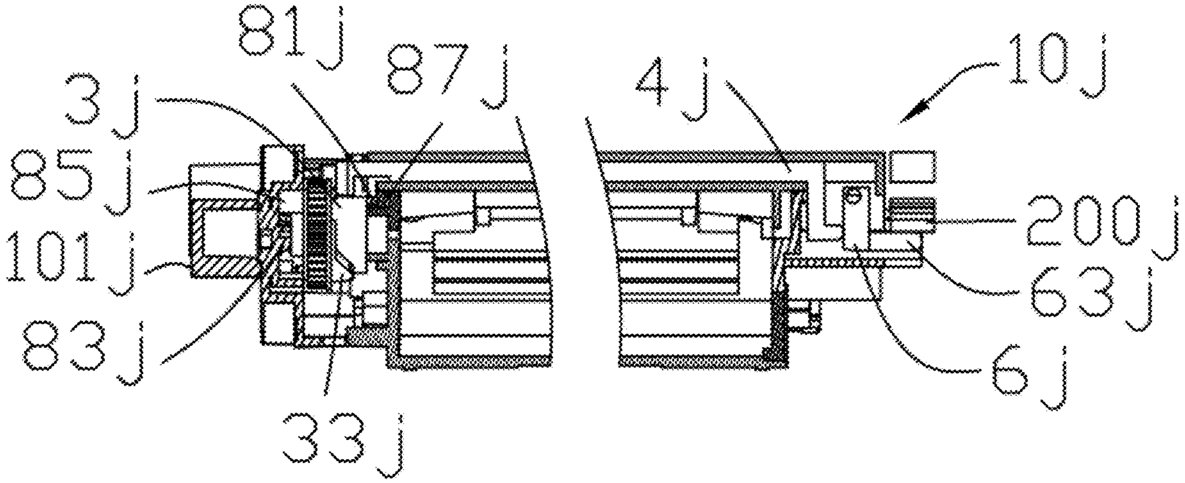
FIG. 35*a* to FIG. 35*c* are views showing the assembly relationship of components of the developing cartridge in Embodiment 10 of the present disclosure during the inspection process.

As shown in FIG. 35*a*, when the developing cartridge 10*j* is mounted in the imaging apparatus, the detected portion 63*j* of the detected member 6*j* is pressed by the transmission mechanism 200*j*, the transmission member 4*j* is pressed against the cam member 3*j*, the third protruding portion 85*j* is pressed against the inner wall of the first end cap 101*j*, and the first protruding portion 81*j* is pressed against the support member 87*j*.

Figure 35B:
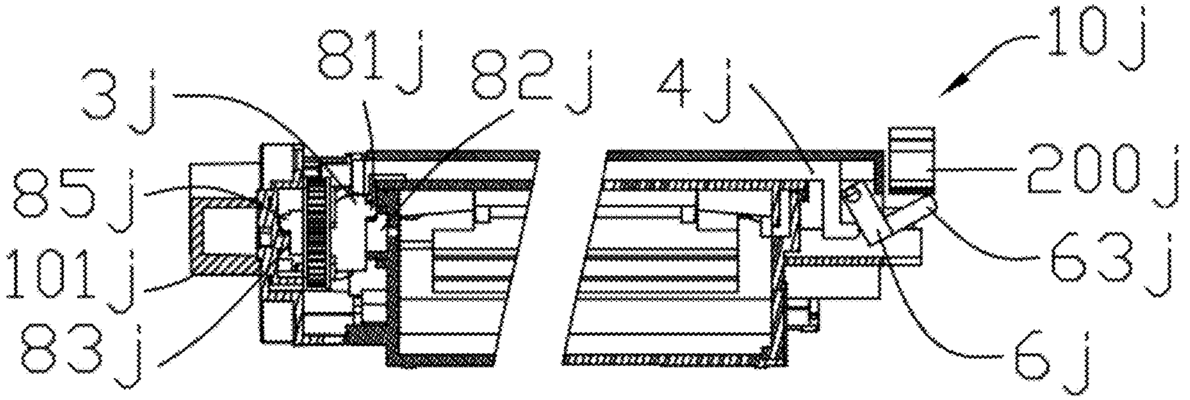

As shown in FIG. 35*b*, when the cam portion 33*j* pushes the transmission member 4*j*. As a result, the transmission member 4*j* pushes the detected member 6*j*, and the detected portion 63*j* of the detected member 6*j* pivots upwardly and pushes the transmission mechanism 200*j* enabling detection to occur.

Figure 35C:
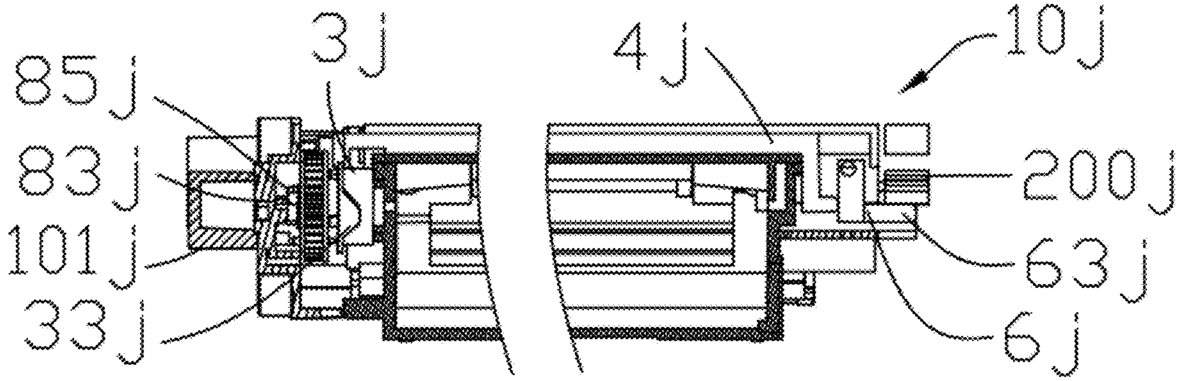

As shown in FIG. 35*c*, as the cam member 3*j* rotates and the cam portion 33*j* disengages from the transmission member 4*j*, the transmission mechanism 200*j* elastically returns to press the detected portion 63*j* downwardly returning it to its initial position.

When the second protruding portion 83*j* pushes the third protruding portion 85*j*, the first protruding portion 81*j* is disposed at the opening 82*j*, thereby causing the cam member 3*j* to move to the right side. As a result, the rotational force receiving portion 313*j* of the cam member 3*j* is disconnected from the rotational force transmitting portion 323*j* of the second gear member 32*j*. Consequently, the transmission of the rotational force is interrupted and detection is completed.

With this structure, the developing cartridge 10*j* is provided with a sliding groove portion 16*j*, which improves the sliding effectiveness for the transmission member 4*j* and reduces the contacting and interference from the external environment. The developing cartridge 10*j* is provided with a covering portion 7*j*, which effectively protects the transmission member 4*j* and the detected member 6*j* from external collisions and interference. Moreover, the developing cartridge 10*j* in the present embodiment may omit the second end cap, reducing the number of parts and lowering production costs.

The developing cartridge 10*j* in the present embodiment further comprises a toner filling port 106*j* and a filling cover 107*j*. The toner filling port is disposed on the second side wall 12*j* of the developing cartridge and connects to the powder compartment. A chip and a chip holder may also be provided at the first end of the developing cartridge.

In some embodiments, the second protruding portion 83*j* can move along the pressing surface of the third protruding portion 85*j* to the top of the third protruding portion 85*j* to force the cam member 3*j* to move along the longitudinal direction of the developing cartridge 10*j*.

In some embodiments, the second gear member 32*j* may be integrally molded with or fixedly connected to the cam member 3*j*. In this case, when the cam member 3*j* moves along the longitudinal direction of the developing cartridge 10*j*, the second gear member 32*j* becomes disengaged from the idler wheel 24*j* of the drive force receiving unit, thereby interrupting the transmission of the drive force.

In some embodiments, the second protruding portion 83*j* may not be provided on the end cap, but instead on a component that is fixedly connected to the cartridge body.

In some embodiments, the detected portion may not contact the transmission mechanism 200*j* when the developing cartridge is first loaded into the imaging apparatus.

In some embodiments, the developing cartridge may comprise a resilient reset member that allows the transmission member to return to its initial position when not pushed by the cam portion.

In some embodiments, a rack structure may be used instead of a cam member. In this case, a protruding portion for driving the transmission member can be provided on the rack, and the rack receives the drive force through its tooth portions causing the rack to move. Subsequently, the protruding portion drives the transmission member to move.

In some embodiments, the forcing structure may also be a cooperative structure of a helical groove and a projection. For example, a helical groove extending along the longitudinal direction of the developing cartridge may be provided on the end cap, and a projection that cooperates with the helical groove may be provided on the cam member. In this arrangement, when the cam member rotates, the projection moves along the helical groove resulting in movement along the longitudinal direction of the developing cartridge.

Embodiment 11

This embodiment is an improvement based on Embodiment 10 and its variations, and the shape and structure of the developing cartridge 10*m* in Embodiment 11 are essentially the same as the developing cartridge 10*j* in Embodiment 10, and the same parts will not be repeated, and the following mainly describes the differences.

Figure 36:
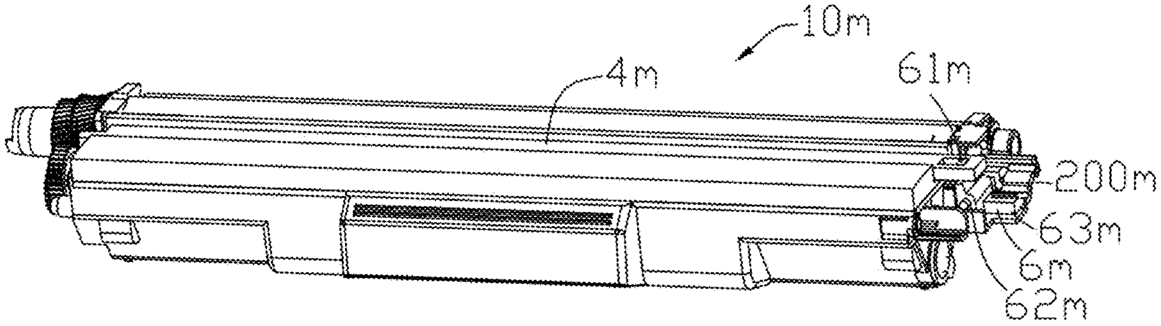
FIG. 36 is a schematic view of the overall structure of the developing cartridge in Embodiment 11 of the present disclosure.
Figure 37:
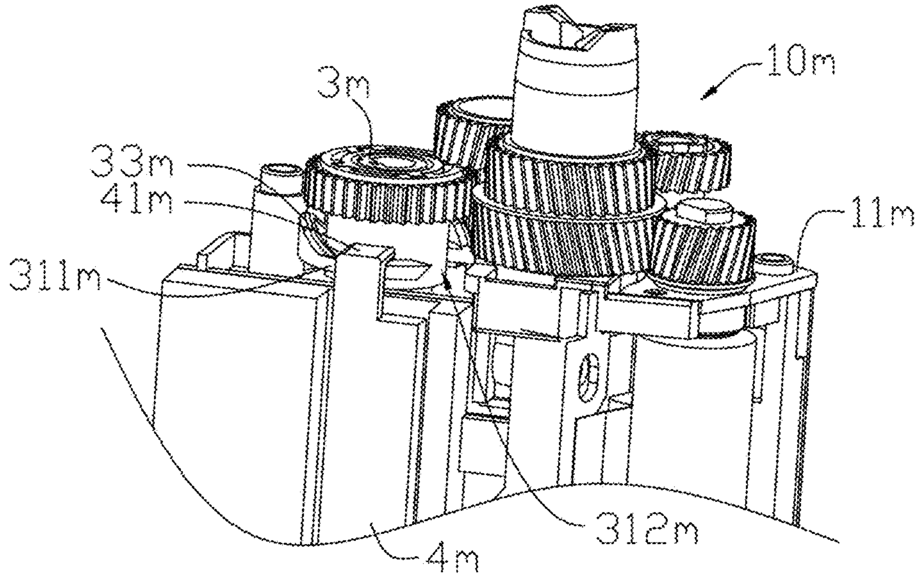
FIG. 37 is a schematic view of a partial structure of a first end of the developing cartridge in Embodiment 11 of the present disclosure.

As shown in FIGS. 36 and 37, the developing cartridge 10*m* comprises a clutch mechanism. Specifically, the clutch mechanism includes a notched portion 312*m*. the specific notched portion 312*m* is provided on the flange portion 311*m*, the cam portion 33*m* protrudes from the flange portion 311*m* along the longitudinal direction of the developing cartridge 10*m* in a direction away from the first side wall 11*m*. Additionally, the flange portion 311*m* also has the notched portion 312*m*. When the transmission member 4*m* falls into the notched portion 312*m*, the cam member 3*m* interrupts the transmission of force to the transmission member 4*m*.

The transmission member 4*m* is in the form of a rod, one end of which is positioned against the flange portion 311*m* of the cam member 3*m* allowing it to be driven by the cam portion 33*m*, and the other end of which is connected to the detected member 6*m* allowing it to drive the detected member 6*m* to move.

The detected member 6*m* is supported at the second end of the covering portion in a manner allowing it to pivot in the up-down direction. Specifically, the force receiving portion 61*m* of the detected member 6*m* extends upwardly and is inserted into an opening or groove at the second end of the transmission member 4*m* allowing it to drive the detected member 6*m* when the transmission member 4*m* moves left or right.

The connection portion 62*m* of the detected member 6*m* is pivotally attached to the covering portion, and the pivot axis of the connection portion 62*m* is located below the force receiving portion 61*m*, and the detected portion 63*m* is located below the force receiving portion 61*m* and below the transmission mechanism 200*m* of the detection unit when mounted in the imaging apparatus, and the detected portion 63*m* can trigger the transmission mechanism 200*m* when it pivots up and down.

In this embodiment, when the developing cartridge 10*m* is mounted in the imaging apparatus, the detected portion 63*m* of the detected member 6*m* is pressed against the transmission mechanism 200*m*. As a result, the force receiving portion 61*m* of the detected member 6*m* pushes the transmission member 4*m* towards the right side causing the transmission member 4*m* to be firmly pressed against the cam member 3*m*.

The coordination of the various components during the process of the developing cartridge being detected by the imaging apparatus will now be described with reference to FIGS. 38*a* through 38*c*.

Figure 38A:
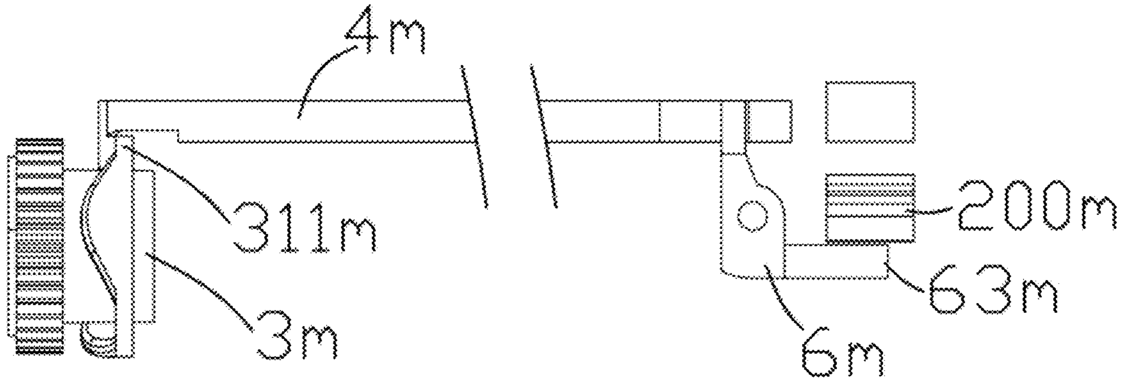
FIG. 38*a* to FIG. 38*c* are views showing the assembly relationship of components of the developing cartridge in Embodiment 11 of the present disclosure during the inspection process.

As shown in FIG. 38*a*, when the developing cartridge 10*m* is mounted in the imaging apparatus, the detected portion 63*m* of the detected member 6*m* is pressed by the transmission mechanism 200*m*, and the transmission member 4*m* is pressed against the flange portion 311*m* of the cam member 3*m*.

Figure 38B:
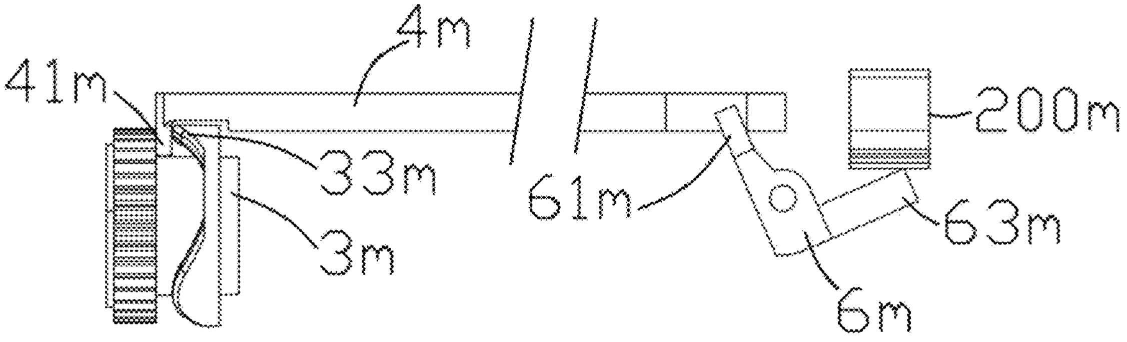

As shown in FIG. 38*b*, when the cam portion 33*m* of the cam member 3*m* pushes the force receiving portion 41*m* of the transmission member 4*m*, the transmission member 4*m* moves towards the left side of the developing cartridge 10*m*, which in turn pivots the force receiving portion 61*m* of the detected member 6*m*. Consequently, the detected portion 63*m* of the detected member 6*m* moves upwardly pushing against the rotation of the transmission mechanism 200*m* of the detection unit enabling detection.

Figure 38C:
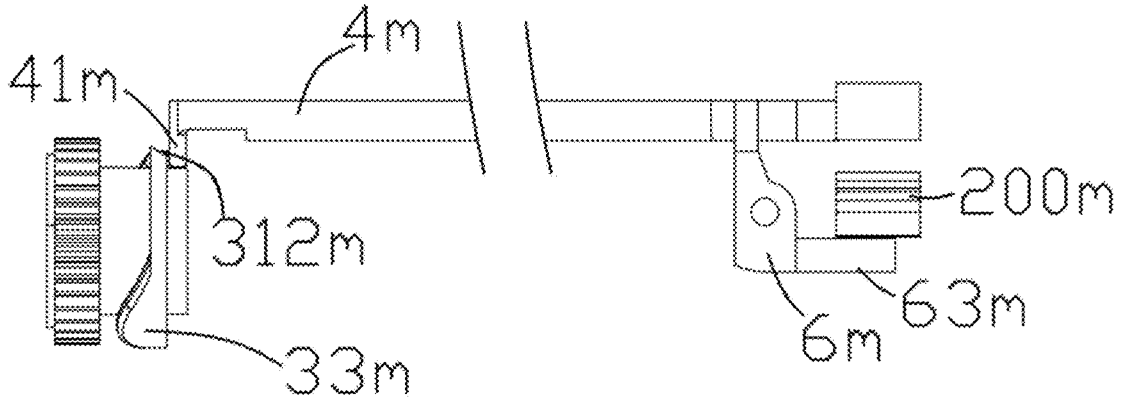

As shown in FIG. 38*c*, when the force receiving portion 41*m* of the transmission member 4*m* moves from the top of the cam portion 33*m* towards the root, the detected member 6*m* drives the transmission member 4*m* towards the right side of the developing cartridge 10*m* under the action of the pressing force of the transmission mechanism 200*m*.

When the force receiving portion 41*m* of the transmission member 4*m* moves to the notched portion 312*m*, under the action of the pressing force of the transmission mechanism 200*m*, the force receiving portion 41*m* of the transmission member 4*m* falls into the notched portion 312*m*, pushed by the detected member 6*m*. It then moves to the right side of the developing cartridge 10*m* under the action of the force from the transmission mechanism 200*m*. The cam member 3*m* continues to rotate but the force receiving portion 41*m* is no longer driven by the cam portion 33*m*. As a result, the transmission of force is interrupted.

This structure of the developing cartridge results in a simple clutch mechanism and low manufacturing cost.

Embodiment 12

This embodiment is an improvement based on the preceding embodiments and their variations. The shape and structure of the developing cartridge 10*k* in Embodiment 12 are essentially the same as the developing cartridges in the preceding embodiments, and the same parts will not be repeated, and the following mainly describes the differences.

Figure 39:
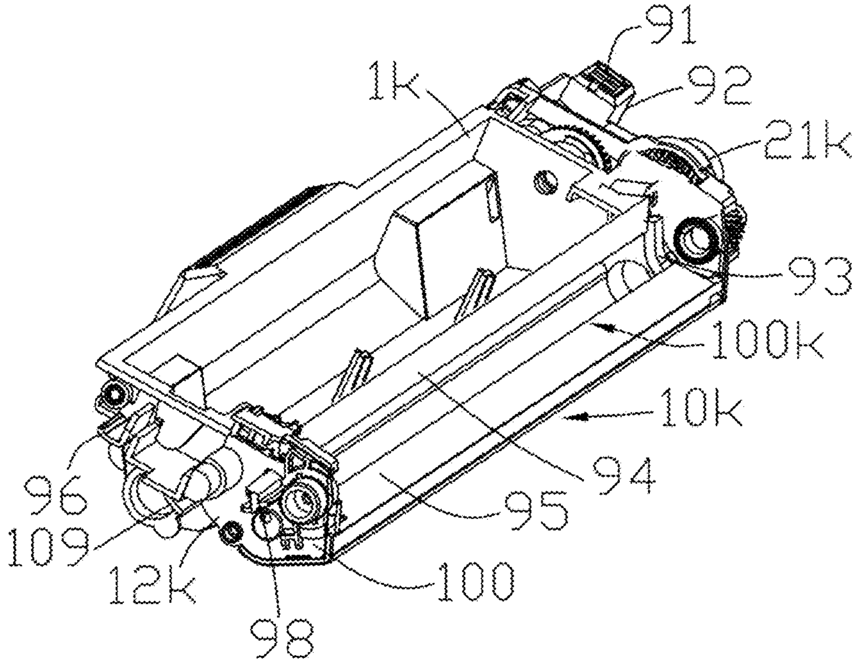
FIG. 39 is a schematic view of a partial structure of the developing cartridge in Embodiment 12 of the present disclosure.
Figure 40:
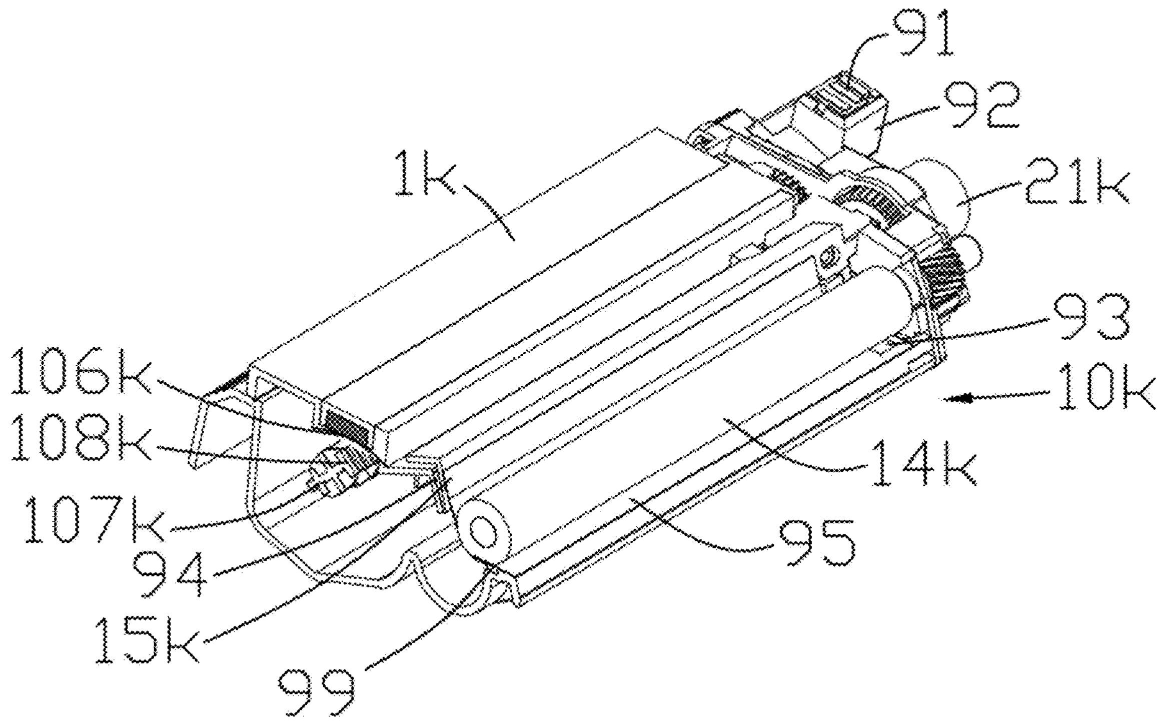
FIG. 40 is a schematic view of another partial structure of the developing cartridge in Embodiment 12 of the present disclosure.
Figure 41:
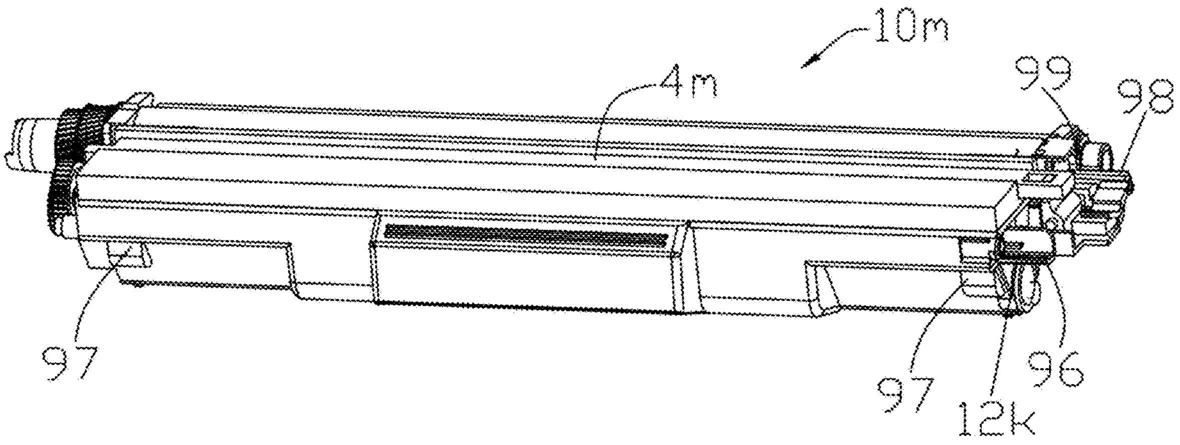
FIG. 41 is a schematic view of the overall structure of the developing cartridge in Embodiment 12 of the present disclosure.

As shown in FIGS. 39 to 41, the developing cartridge 10*k* in the present embodiment is further provided with a chip 91 and a chip mounting bracket 92 for mounting the chip 91. The chip mounting bracket 92 is configured to be mounted to the cartridge body 1*k*. Specifically, the chip 91 and the chip mounting bracket 92 are provided at the first end (also the drive end) of the developing cartridge 10*k*, positioned farther from the development roller 14*k* than the coupling member 21*k*.

In some embodiments, the developing cartridge 10*k* may be removably mounted to a drum cartridge having a photoconductive drum. In this configuration, the developing cartridge 10*k* would be mounted together with the drum cartridge into the imaging apparatus. The drum cartridge may further comprise a pressure applying member, a locking member, and a separation member. The pressure applying member is configured to apply a force to the developing cartridge 10*k* mounted in the drum cartridge causing the development roller 14*k* and the photoconductor drum to come in contact with or close proximity to each other for performing developing operations. The locking member is used for locking and releasing the developing cartridge 10*k* when mounted in the drum cartridge. Specifically, the locking member is a rotatable component including a locking portion and a pushing portion. The separating member is configured to receive a force from the separating mechanism of the imaging apparatus and push the developing cartridge 10*k* causing the development roller 14*k* to move away from the photoconductor drum when an imaging operation is not being carried out. This results in the development roller 14*k* separating from the photoconductor drum.

The developing cartridge 10*k* has a locked portion 96, a forcing portion 97, a pushed portion 109, and a separation force receiving portion 98 on the second side wall 12*k* of the cartridge body 1*k*. The locked portion 96 protrudes from the rear side of the second side wall 12*k* and is designed to be snap-fit with the locking member on the drum cartridge when the developing cartridge 10*k* is mounted in the drum cartridge. The forcing portion 97 is configured to receive a force from the pressure applying member causing the development roller 14*k* and the photoconductor drum to contact or come close to each other. Specifically the forcing portion 97 is provided at and protrudes from the rear side of the cartridge body 1*k*, and the forcing portion 97 is provided in a more rearward position than the locked portion 96. The separation force receiving portion 98 protrudes from the second side wall 12*k* and is designed to receive the action force from the separation member. This causes the developing cartridge 10*k* to move in a direction away from the photoconductor drum, thereby achieving separation between the photoconductor drum and the development roller 14*k*. The separation force receiving portion 98 is located nearer to the development roller 14*k* than the locked portion 96. The pushed portion 109 receives an action force from the pushing portion of the locking member causing the developing cartridge to pivot, thereby causing the locked portion 96 to disengage from the locking portion. Specifically, the pushing portion pushes the pushed portion 109 from its lower side. The pushed portion 109 is positioned between the locked portion 96 and the separating force receiving portion 98.

When projected along the longitudinal direction of the developing cartridge 10*k*, the separation force receiving portion 98 is located at on or near the line connecting the center of rotation of the development roller 14*k* to the rotational axis of the coupling member 21*k*. The separation force receiving portion 98 is disposed nearer to the development roller 14*k* than the locked portion 96 and the forcing portion 97. Specifically, the separation force receiving portion 98 protrudes from the second side wall 12*k* along the longitudinal direction of the developing cartridge 10*k* passing through a through-hole located in the bearing member 100. This bearing member 100 is mounted on the second side wall 12*k* of the cartridge body 1*k*.

A sealing assembly is also provided between the cartridge body 1*k* of the developing cartridge 10*k* and the development roller 14*k*, the powder feed roller, and the powder discharge knife 15*k* to prevent toner from leaking through the gaps between these components. Specifically, in this embodiment, the sealing assembly comprises a first sealing member 93, a second sealing member 94, and a third sealing member 95. The first sealing member 93 is provided at the two ends of the longitudinal direction of the opening portion of the cartridge body 1*k* to seal the gap between the development roller 14*k* and the cartridge body 1*k*. Specifically, the first sealing member 93 may be made of felt.

The second sealing member 94 is in the form of an elongated strip provided between the powder discharge knife 15*k* and the cartridge body 1*k*. It is positioned on the rear side of the opening portion 100*k* to seal the gap between the powder discharge knife 15*k* and the cartridge body 1*k*. The second sealing member 94 may be made of sponge. The third sealing member 95 is provided between the development roller 14*k* and the cartridge body 1*k*. It is positioned on the front side of the opening portion 100 to seal the gap between the development roller 14*k* and the rear side of the opening portion. The third sealing member 95 may be in the form of a resilient wiper or sheet.

The joints between the first sealing member 93 and the second sealing member 94 and between the first sealing member 93 and the third sealing member 95 may be created through an interference fit or filled with glue. The first sealing member 93, the second sealing member 94, and the third sealing member 95 are connected to form an annular sealing body. This sealing body surrounds the opening portion 100*k*.

The powder compartment of the developing cartridge is also provided with a stirring member. This stirring member comprises a shaft portion 107*k* and a stirring portion 108*k* extending outwardly from the shaft portion 107*k*. Additionally, a concave portion 106*k* is provided at the top of the powder compartment. The concave portion 106*k* allows to prevent the stirring portion 108*k* from interfering with the side wall of the powder compartment during rotation.

In some embodiments, a support member 99 is provided between the third sealing member 95 and the cartridge body 1*k*. This support member 99 is in the form of an elongated strip that supports the third sealing member 95, allowing it to be tilted at an angle.

In some embodiments, the separation force receiving portion 98 and the bearing member can be made electrically conductive. In this configuration, the separation force receiving portion 98 can receive electrical power from the imaging apparatus and pass it through the bearing member to components such as the development roller 14*k*.

Across various embodiments and their variations, the movement direction of the detected member can also be simply changed as required. Additionally, the position of the detected member can also be flexibly designed, greatly improving the flexibility of the design of the developing cartridge. Furthermore, by adjusting the position of the detected member, it facilitates the miniaturization of the developing cartridge.

Throughout the various embodiments and their variations, the detected member is driven by a transmission member, with at least a portion moving along the longitudinal direction of the cartridge body to drive the detected member. This design eliminate the rotary shaft of the stirring member, which not only eliminates the risk of the need for using the rotational shaft of the stirring member being prone to deformation or even fracture, but also solves the problem of delayed transmission of drive force due to deformation of the rotary shaft of the stirring member to transmit the driving force to the detected member. Consequently, this not only eliminates the risk of deformation or even breakage of the rotational shaft of the stirring member, but also solves the problem of delayed transmission of the drive force due to deformation of the rotational shaft of the stirring member, and improves the detection accuracy.

Finally, it should be noted that, unless there are contradictory or mutually exclusive circumstances, the different embodiments and their variations disclosed above may be cited, referred to, or combined with each other. Additionally, the technical features of different embodiments and their variations may also be combined and/or replaced with each other.

The aforementioned embodiments are provided to exemplify the technical solution of the present disclosure and are not intended to be limiting thereof. To facilitate the differentiation of different components, the present disclosure introduces terms such as “first”, “second”, etc. However, the terms “first”, “second”, etc. are not to be understood as quantitative limitations on these components. For example, when the driving member described in the present disclosure is described as having a second gear portion, it should not be interpreted to mean that the driving member necessarily has a first gear portion or a third gear portion.

According to the description provided, the parts described as “first”, “second”, and the like may be singular or may include a plurality of parts. The terms “upper”, “upper side”, “lower”, and “lower side” are based on the illustrations in the accompanying drawings and are not intended as specific limitations on their orientation. Although the present disclosure has been described in detail with reference to the foregoing embodiments, a person of ordinary skill in the art should understand that it is still possible to modify the technical solutions described in the foregoing embodiments or to replace some or all of the technical features therein with equivalent ones. Such modifications or replacements should not be considered to alter the essence of the corresponding technical solutions or extend beyond the scope of the technical solutions of the embodiments described in the present disclosure.

What is claimed is:

1. A developing cartridge removably mountable in a main assembly of an imaging apparatus along a front-rear direction of the developing cartridge, comprising:

a cartridge body;

a drive force receiving unit, provided at a first end of the developing cartridge;

a driving member, provided at the first end of the developing cartridge and configured to receive a drive force and move;

a transmission member configured to receive a force from the driving member, wherein the force from the driving member causes at least a portion of the transmission member to move in a longitudinal direction of the cartridge body;

a detected member, provided at a second end of the developing cartridge opposite to the first end along the longitudinal direction of the cartridge body, the detected member being configured to be driven by the transmission member; and a sliding groove portion provided on an upper surface of the cartridge body, wherein the transmission member is at least partially mounted in the sliding groove portion, and the sliding groove portion is configured to restrict movement of the transmission member along an up-down direction perpendicular to the longitudinal direction and a front-rear direction of the cartridge body.

2. The developing cartridge according to claim 1, wherein the sliding groove portion protrudes from the upper surface of the cartridge body, and the sliding groove portion is positioned higher than the transmission member along the up-down direction.

3. The developing cartridge according to claim 1, wherein a plurality of sliding groove portions are provided and are spaced apart along the longitudinal direction of the cartridge body.

4. The developing cartridge according to claim 1, wherein the detected member is configured as a sliding member and is configured to slide in response to a pushing force from the transmission member.

5. The developing cartridge according to claim 4, wherein the detected member is configured to move linearly in the front-rear direction of the cartridge body.

6. The developing cartridge according to claim 1, wherein the transmission member comprises a rod portion slidably disposed on the cartridge body and extending along the longitudinal direction, and at least a portion of the rod portion is disposed between the first end and the second end of the developing cartridge.

7. The developing cartridge according to claim 6, wherein the detected member comprises a force receiving portion and a detected portion, the force receiving portion being movably connected to the rod portion, and the detected portion extending in a direction different from an extension direction of the force receiving portion.

8. The developing cartridge according to claim 6, further comprising a resilient member provided at a first end of the rod portion and configured to support the rod portion.

9. The developing cartridge according to claim 1, wherein the driving member comprises a cam member, the cam member comprises a main body portion and a cam portion configured to push the transmission member, and the cam portion protrudes from an end face of the main body portion along the longitudinal direction of the cartridge body.

10. The developing cartridge according to claim 9, further comprising a clutch mechanism configured to interrupt transmission of the drive force to the transmission member, wherein the clutch mechanism comprises a missing tooth portion provided on an outer circumferential surface of the main body portion.

11. The developing cartridge according to claim 9, further comprising a clutch mechanism configured to interrupt transmission of the drive force to the transmission member, wherein the clutch mechanism comprises a notched portion provided on a radially outer side of the main body portion.

12. The developing cartridge according to claim 11, wherein the transmission member comprises a force receiving portion configured to be pushed by the cam portion, and the force receiving portion is configured to fall into the notched portion such that the force receiving portion no longer receives a force from the cam portion.

13. The developing cartridge according to claim 9, wherein the transmission member is movable between a first position not pushed by the cam portion and a second position pushed by the cam portion.

14. The developing cartridge according to claim 13, further comprising a resilient member configured to apply a force to the transmission member to enable the transmission member to move from the second position towards the first position.

15. The developing cartridge according to claim 1, further comprising a resilient member, wherein one end of the resilient member resists the cartridge body and another end of the resilient member resists the transmission member, and the transmission member comprises a housing portion for housing the resilient member.

16. A developing cartridge removably mountable in a main assembly of an imaging apparatus along a front-rear direction of the developing cartridge, comprising:

a cartridge body;

a drive force receiving unit, provided at a first end of the developing cartridge;

a driving member, provided at the first end of the developing cartridge and configured to receive a drive force and move;

a transmission member configured to receive a force from the driving member, wherein the force from the driving member causes at least a portion of the transmission member to move in a longitudinal direction of the cartridge body;

a detected member, provided at a second end of the developing cartridge opposite to the first end along the longitudinal direction of the cartridge body, the detected member being configured to be driven by the transmission member; and a sliding groove portion provided on an upper side of the cartridge body, wherein the transmission member is at least partially and slidably accommodated in the sliding groove portion, and an upper surface of the transmission member is flush with or lower than an upper surface of the cartridge body.

17. The developing cartridge according to claim 16, further comprising a covering portion at least partially covering the transmission member.

18. The developing cartridge according to claim 17, wherein opposite ends of the covering portion are provided with a first exposed portion and a second exposed portion, respectively, the first exposed portion and the second exposed portion are configured as openings;

one end of the transmission member is configured to extend through the first exposed portion; and a detected portion of the detected member is configured to be exposed through the second exposed portion.

19. The developing cartridge according to claim 17, wherein a second end of the covering portion is provided with an accommodating cavity for accommodating the detected member.

20. The developing cartridge according to claim 16, wherein the transmission member is a flexible transmission member, and the driving member and the flexible transmission member form a transmission direction-change unit configured to transmit a rotational force of the drive force receiving unit to the detected member to cause the detected member to move, a movement direction of the detected member intersects with a rotational axis of the drive force receiving unit, and the movement of the detected member is a linear motion, a rotational motion, or a curvilinear motion.

* * * * *